US010560792B2

(12) United States Patent
Lin et al.

(10) Patent No.: US 10,560,792 B2
(45) Date of Patent: *Feb. 11, 2020

(54) REPRODUCING AUDIO SIGNALS WITH A HAPTIC APPARATUS ON ACOUSTIC HEADPHONES AND THEIR CALIBRATION AND MEASUREMENT

(71) Applicant: Alpine Electronics of Silicon Valley, Inc., Santa Clara, CA (US)

(72) Inventors: Rocky Chau-Hsiung Lin, Cupertino, CA (US); Thomas Yamasaki, Anaheim Hills, CA (US)

(73) Assignee: Alpine Electronics of Silicon Valley, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/669,823

(22) Filed: Aug. 4, 2017

(65) Prior Publication Data

US 2017/0332162 A1 Nov. 16, 2017

Related U.S. Application Data

(63) Continuation of application No. 14/609,357, filed on Jan. 29, 2015, now Pat. No. 9,729,985, which is a
(Continued)

(51) Int. Cl.
*H04R 29/00* (2006.01)
*G01H 11/06* (2006.01)
(Continued)

(52) U.S. Cl.
CPC ............. *H04R 29/00* (2013.01); *G01H 11/06* (2013.01); *G06F 3/165* (2013.01); *H04R 1/1008* (2013.01);
(Continued)

(58) Field of Classification Search
CPC .... A61B 5/6803; A61B 5/6815; G01H 11/06; G01H 11/08; G06F 3/011; G06F 3/16;
(Continued)

(56) References Cited

U.S. PATENT DOCUMENTS 1,969,559 A 8/1934 Kelly
2,151,706 A 3/1939 Lieber
(Continued)

FOREIGN PATENT DOCUMENTS

AU 52098/96 B 1/1997
CN 101310557 A 11/2008
(Continued)

OTHER PUBLICATIONS

Braida et al., "Review of Recent Research on Multiband Amplitude Compression for the Hearing Impaired," Research Laboratory of Electronics, Massachusetts Institute of Technology, 133-140, 1982.
(Continued)

*Primary Examiner* — Duc Nguyen
*Assistant Examiner* — Alexander L Eljaiek
(74) *Attorney, Agent, or Firm* — Perkins Coie LLP

(57) ABSTRACT

Method and devices for testing a headphone with increased sensation are provided. The headphone can filter and amplify low frequency audio signals, which are then sent to a haptic device in the headphone. The haptic device can cause bass sensations at the top of the skull and at both ear cups. The testing system can evaluate the haptic and acoustic sensations produced by the headphone to evaluate if they have been properly assembled and calibrate the headphones if necessary.

13 Claims, 15 Drawing Sheets

Related U.S. Application Data continuation of application No. 14/512,679, filed on Oct. 13, 2014, now Pat. No. 8,977,376, which is a continuation-in-part of application No. 14/269,015, filed on May 2, 2014, now Pat. No. 8,892,233, which is a continuation of application No. 14/181,512, filed on Feb. 14, 2014, now Pat. No. 8,767,996.

(60) Provisional application No. 61/924,148, filed on Jan. 6, 2014.

(51) Int. Cl.
*H04R 1/10* (2006.01)
*H04R 31/00* (2006.01)
*H04R 1/22* (2006.01)
*H04R 3/04* (2006.01)
*G06F 3/16* (2006.01)

(52) U.S. Cl.
CPC .............. *H04R 1/1091* (2013.01); *H04R 1/22* (2013.01); *H04R 3/04* (2013.01); *H04R 31/00* (2013.01); *H04R 1/1041* (2013.01); *H04R 2420/07* (2013.01); *H04R 2460/13* (2013.01)

(58) Field of Classification Search
CPC .............. G06F 3/165; G10H 2220/525; G10K 2210/1081; H04R 1/10; H04R 1/1008; H04R 1/1016; H04R 1/1058; H04R 1/1075; H04R 1/1091; H04R 3/00; H04R 5/033; H04R 5/0335; H04R 17/00; H04R 25/606; H04R 29/00; H04R 2460/13
USPC ............ 29/592.1, 594; 73/1.82, 40.5 A, 579, 73/584, 585, 587, 646, 649; 381/56, 58, 381/60, 74, 151, 162, 190, 309, 312, 322, 381/328, 370, 371, 374, 380, 384; 600/27, 300, 528, 559; 601/47; 700/94; 702/56, 76, 104, 183, 189
See application file for complete search history.

(56) References Cited

U.S. PATENT DOCUMENTS

| | | |
|---|---|---|
| 2,249,572 A | 7/1941 | Lieber |
| 2,681,389 A | 6/1954 | Shaper |
| 2,930,858 A | 3/1960 | Hollingsworth |
| 3,125,646 A | 3/1964 | Lewis |
| 3,134,861 A | 5/1964 | Dempsey et al. |
| 3,571,529 A | 3/1971 | Gharib et al. |
| 3,586,425 A | 6/1971 | Gilman |
| 3,600,068 A | 8/1971 | Jolicoeur, Jr. et al. |
| 3,604,861 A | 9/1971 | Lewis et al. |
| 3,718,763 A | 2/1973 | Cannon et al. |
| 3,764,745 A | 10/1973 | Bottcher et al. |
| 3,808,354 A | 4/1974 | Feezor et al. |
| 3,894,195 A | 7/1975 | Kryter |
| 3,962,543 A | 6/1976 | Blauert et al. |
| 3,980,842 A | 9/1976 | Weisbrich |
| 3,989,904 A | 11/1976 | Rohrer et al. |
| 4,006,318 A | 2/1977 | Sebesta et al. |
| 4,039,750 A | 8/1977 | Hull |
| 4,051,331 A | 9/1977 | Strong et al. |
| 4,110,583 A | 8/1978 | Lepper |
| 4,173,715 A | 11/1979 | Gosman |
| 4,201,225 A | 5/1980 | Bethea, III et al. |
| 4,284,847 A | 8/1981 | Besserman |
| 4,289,935 A | 9/1981 | Zollner et al. |
| 4,309,575 A | 1/1982 | Zweig et al. |
| 4,425,481 A | 1/1984 | Mansgold et al. |
| 4,471,171 A | 9/1984 | Köpke et al. |
| 4,548,082 A | 10/1985 | Engebretson et al. |
| 4,591,668 A | 5/1986 | Iwata |
| 4,622,440 A | 11/1986 | Slavin |
| 4,677,679 A | 6/1987 | Killion |
| 4,731,850 A | 3/1988 | Levitt et al. |
| 4,791,672 A | 12/1988 | Nunley et al. |
| 4,821,323 A | 4/1989 | Papiernik |
| 4,868,880 A | 9/1989 | Bennett, Jr. |
| 4,879,749 A | 11/1989 | Levitt et al. |
| 4,887,299 A | 12/1989 | Cummins et al. |
| 4,901,355 A | 2/1990 | Moore |
| 4,926,139 A | 5/1990 | Anderson et al. |
| 4,972,468 A | 11/1990 | Murase et al. |
| 5,027,410 A | 6/1991 | Williamson et al. |
| 5,046,102 A | 9/1991 | Zwicker et al. |
| 5,054,079 A | 10/1991 | Frielingsdorf et al. |
| 5,086,464 A | 2/1992 | Groppe |
| 5,146,501 A | 9/1992 | Spector |
| 5,164,987 A | 11/1992 | Raven |
| 5,195,132 A | 3/1993 | Bowker et al. |
| 5,197,332 A | 3/1993 | Shennib |
| 5,323,468 A | 6/1994 | Bottesch |
| 5,333,195 A | 7/1994 | Bowker et al. |
| 5,335,285 A | 8/1994 | Gluz |
| 5,355,418 A | 10/1994 | Kelsey et al. |
| 5,371,799 A | 12/1994 | Lowe et al. |
| 5,388,185 A | 2/1995 | Terry et al. |
| 5,406,633 A | 4/1995 | Miller et al. |
| 5,406,635 A | 4/1995 | Jarvinen |
| 5,438,626 A | 8/1995 | Neuman et al. |
| 5,452,359 A | 9/1995 | Inanaga et al. |
| RE35,051 E | 10/1995 | Moore |
| 5,457,751 A | 10/1995 | Such |
| 5,485,515 A | 1/1996 | Allen et al. |
| 5,495,534 A | 2/1996 | Inanaga et al. |
| 5,500,902 A | 3/1996 | Stockham, Jr. et al. |
| 5,506,911 A | 4/1996 | Neuman et al. |
| 5,521,919 A | 5/1996 | Anderson et al. |
| 5,524,148 A | 6/1996 | Allen et al. |
| 5,526,423 A | 6/1996 | Ohuchi et al. |
| 5,539,806 A | 7/1996 | Allen et al. |
| 5,590,213 A * | 12/1996 | Urella .................. H04R 5/0335 381/370 |
| 5,592,545 A | 1/1997 | Ho et al. |
| 5,596,507 A | 1/1997 | Jones et al. |
| 5,608,803 A | 3/1997 | Magotra et al. |
| 5,615,270 A | 3/1997 | Miller et al. |
| 5,630,159 A | 5/1997 | Zancho |
| 5,638,438 A | 6/1997 | Keen |
| 5,642,426 A | 6/1997 | Neuman et al. |
| 5,663,727 A | 9/1997 | Vokac |
| 5,706,352 A | 1/1998 | Engebretson et al. |
| 5,715,323 A | 2/1998 | Walker |
| 5,717,767 A | 2/1998 | Inanaga et al. |
| 5,721,783 A | 2/1998 | Anderson |
| 5,737,389 A | 4/1998 | Allen |
| 5,737,719 A | 4/1998 | Terry |
| 5,794,201 A | 8/1998 | Nejime et al. |
| 5,802,164 A | 9/1998 | Clancy et al. |
| 5,811,681 A | 9/1998 | Braun et al. |
| 5,848,171 A | 12/1998 | Stockham, Jr. et al. |
| 5,854,843 A | 12/1998 | Jacknin et al. |
| 5,854,978 A | 12/1998 | Heidari |
| 5,867,457 A | 2/1999 | Parvulescu et al. |
| 5,867,582 A | 2/1999 | Nagayoshi |
| 5,868,683 A | 2/1999 | Protopapas et al. |
| 5,890,124 A | 3/1999 | Galbi |
| 5,892,836 A | 4/1999 | Ishige et al. |
| 5,896,449 A | 4/1999 | Oshidari et al. |
| 5,903,076 A | 5/1999 | Suyama |
| 5,903,655 A | 5/1999 | Salmi et al. |
| 5,907,823 A | 5/1999 | Sjoberg et al. |
| 5,910,990 A | 6/1999 | Jang |
| 5,923,764 A | 7/1999 | Shennib |
| 5,928,160 A | 7/1999 | Clark et al. |
| 5,930,758 A | 7/1999 | Nishiguchi et al. |
| 5,943,413 A | 8/1999 | Ash et al. |
| 5,956,674 A | 9/1999 | Smyth et al. |
| 5,974,380 A | 10/1999 | Smyth et al. |
| 5,978,762 A | 11/1999 | Smyth et al. |
| 5,986,813 A | 11/1999 | Saikawa et al. |
| 5,987,418 A | 11/1999 | Gentit |

(56) References Cited

U.S. PATENT DOCUMENTS

| | | | |
|---|---|---|---|
| 6,022,315 | A | 2/2000 | Iliff |
| 6,029,126 | A | 2/2000 | Malvar |
| 6,036,496 | A | 3/2000 | Miller et al. |
| 6,055,502 | A | 4/2000 | Kitamura |
| 6,061,431 | A | 5/2000 | Knappe et al. |
| 6,072,885 | A | 6/2000 | Stockham, Jr. et al. |
| 6,078,675 | A | 6/2000 | Bowen-Nielsen et al. |
| 6,084,975 | A | 7/2000 | Perkins |
| 6,094,481 | A | 7/2000 | Deville et al. |
| 6,098,039 | A | 8/2000 | Nishida |
| 6,104,822 | A | 8/2000 | Melanson et al. |
| 6,141,427 | A | 10/2000 | Fukuda |
| 6,212,496 | B1 | 4/2001 | Campbell et al. |
| 6,233,345 | B1 | 5/2001 | Urwyler |
| 6,298,249 | B1 | 10/2001 | Locarno et al. |
| 6,322,521 | B1 | 11/2001 | Hou |
| 6,433,801 | B1 | 8/2002 | Moon et al. |
| 6,463,128 | B1 | 10/2002 | Elwin |
| 6,483,925 | B1 | 11/2002 | Shen et al. |
| 6,603,863 | B1* | 8/2003 | Nagayoshi ............ H04R 1/1066 381/370 |
| 6,674,867 | B2 | 1/2004 | Basseas |
| 6,684,063 | B2 | 1/2004 | Berger et al. |
| 6,694,143 | B1 | 2/2004 | Beamish et al. |
| 6,792,122 | B1 | 9/2004 | Okada et al. |
| 6,913,578 | B2 | 7/2005 | Hou |
| 6,944,309 | B2 | 9/2005 | Terai et al. |
| 7,110,743 | B2 | 9/2006 | Depew et al. |
| 7,123,737 | B2 | 10/2006 | Ham |
| 7,181,297 | B1 | 2/2007 | Pluvinage et al. |
| 7,324,655 | B2 | 1/2008 | Sato |
| 7,848,512 | B2 | 12/2010 | Eldracher |
| 7,983,437 | B2 | 7/2011 | Wong et al. |
| 8,139,803 | B2 | 3/2012 | Afshar |
| 8,175,302 | B2 | 5/2012 | Tanghe et al. |
| 8,175,316 | B2 | 5/2012 | Yamagishi et al. |
| 8,213,632 | B2 | 7/2012 | Yamagishi et al. |
| 8,411,893 | B2 | 4/2013 | Ito et al. |
| 8,433,580 | B2 | 4/2013 | Sugiyama et al. |
| 8,447,042 | B2 | 5/2013 | Gurin |
| 8,473,099 | B2 | 6/2013 | Sugiyama et al. |
| 8,538,059 | B2 | 9/2013 | Yamagishi et al. |
| 8,767,996 | B1* | 7/2014 | Lin ...................... H04R 1/1091 381/380 |
| 8,892,233 | B1 | 11/2014 | Lin et al. |
| 8,977,376 | B1 | 3/2015 | Lin et al. |
| 9,083,821 | B2 | 7/2015 | Hughes |
| 9,729,985 | B2 | 8/2017 | Lin et al. |
| 2002/0068986 | A1 | 6/2002 | Mouline |
| 2003/0128859 | A1 | 7/2003 | Greene et al. |
| 2003/0165247 | A1 | 9/2003 | Bantz et al. |
| 2006/0095516 | A1 | 5/2006 | Wijeratne |
| 2006/0171553 | A1 | 8/2006 | Wong et al. |
| 2007/0038164 | A1 | 2/2007 | Afshar |
| 2007/0081529 | A1 | 4/2007 | Sugiyama et al. |
| 2008/0112581 | A1* | 5/2008 | Kim ..................... H04R 1/1075 381/151 |
| 2008/0318597 | A1 | 12/2008 | Bems et al. |
| 2009/0185699 | A1 | 7/2009 | Kim |
| 2010/0278359 | A1 | 11/2010 | Rostami |
| 2011/0009770 | A1 | 1/2011 | Margolis et al. |
| 2011/0170702 | A1 | 7/2011 | Bays |
| 2012/0035513 | A1 | 2/2012 | Afshar |
| 2013/0218942 | A1 | 8/2013 | Willis et al. |
| 2014/0073486 | A1 | 3/2014 | Ahmed et al. |
| 2015/0216762 | A1* | 8/2015 | Oohashi ................ A61M 21/02 601/47 |

FOREIGN PATENT DOCUMENTS

| | | |
|---|---|---|
| DE | 19600234 A1 | 7/1997 |
| DE | 29905172 U1 | 6/1999 |
| DE | 19815373 A1 | 10/1999 |
| EP | 0329383 A2 | 8/1989 |
| EP | 1931170 A2 | 6/2008 |
| EP | 2302953 A2 | 3/2011 |
| JP | H111133998 A | 5/1999 |
| JP | 2000236280 A | 8/2000 |
| WO | 1995006996 A1 | 3/1995 |
| WO | 1998005150 A1 | 2/1998 |
| WO | 1998047314 A2 | 10/1998 |
| WO | 1998051124 A1 | 11/1998 |
| WO | 1998051126 A1 | 11/1998 |
| WO | 1999014986 A1 | 3/1999 |
| WO | 1999031937 A1 | 6/1999 |
| WO | 2000064350 A1 | 11/2000 |
| WO | 2001052737 A1 | 7/2001 |

OTHER PUBLICATIONS

Lippmann, et al., "Study of Multichannel Amplitude Compression and Linear Amplification for Persons with Sensorineural Hearing Loss," Acoustical Society of America Feb. 69(2):524-534, 1981.

Sony Online World, Memory Stick, The Concept, http://www.world.sony.com/Electronics/MS/concept/exp2.html, Oct. 11, 1999.

Unser, et al., "B-Spline Signal Processing: Part II-Efficient Design and Applications," IEEE Transactions on Signal Processing, 41(2):834-848, 1993.

U.S. Appl. No. 60/177,695, filed Jan. 24, 2000 entitled "Remote Hearing Test," inventor Zezhang Hou.

U.S. Appl. No. 60/189,010, filed Mar. 13, 2000 entitled "Method and System for On-Line Hearing Examination and Correction," inventor Zezhang Hou.

Villchur, et al., "Signal Processing to Improve Speech Intelligibility in Perceptive Deafness," The Journal of the Acoustical Society of America, 53(6):1646-1657, 1973.

Wireless Short Message Service (SMS) TeleCommunication Systems Web ProForum Tutorials, pp. 1-18.

* cited by examiner

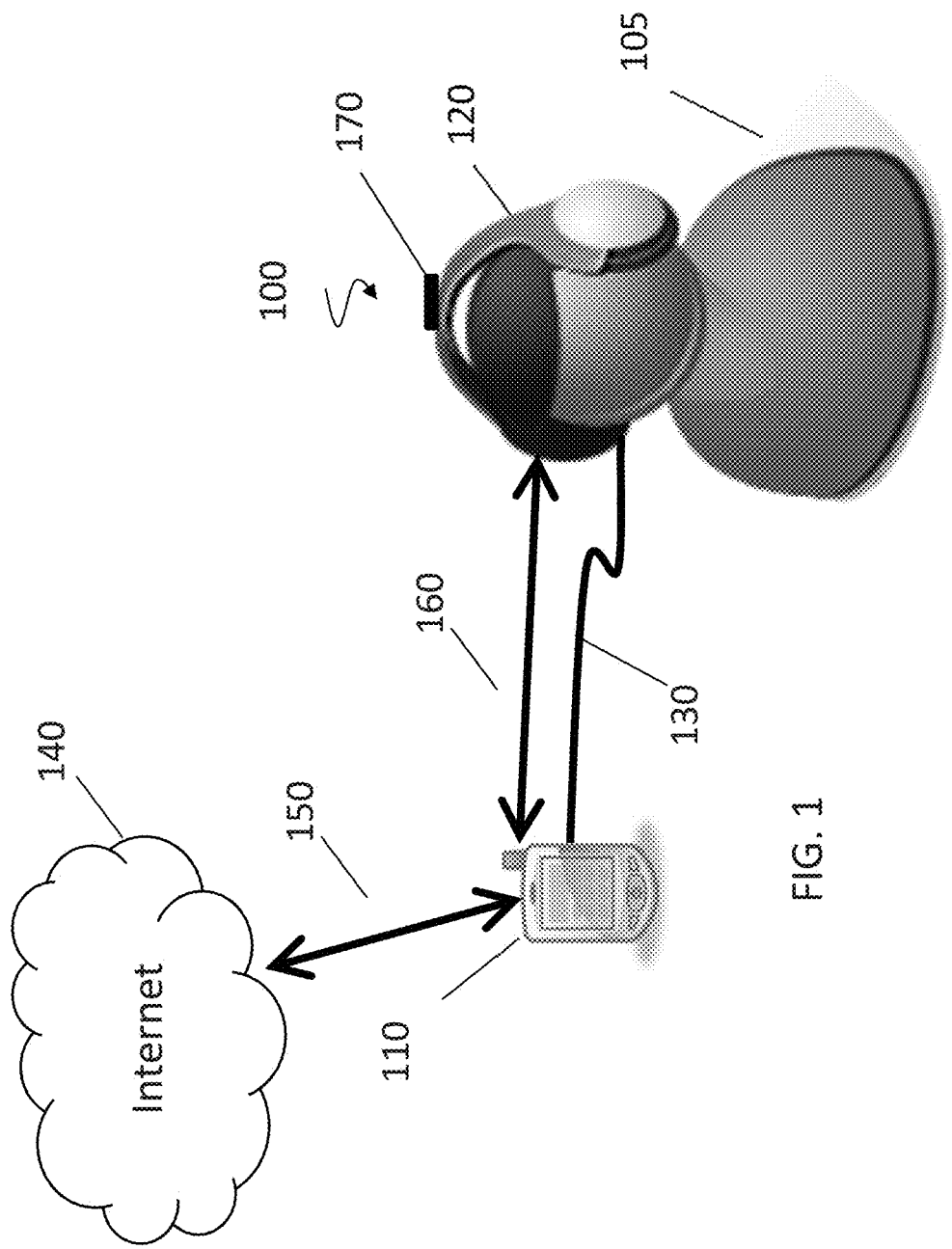

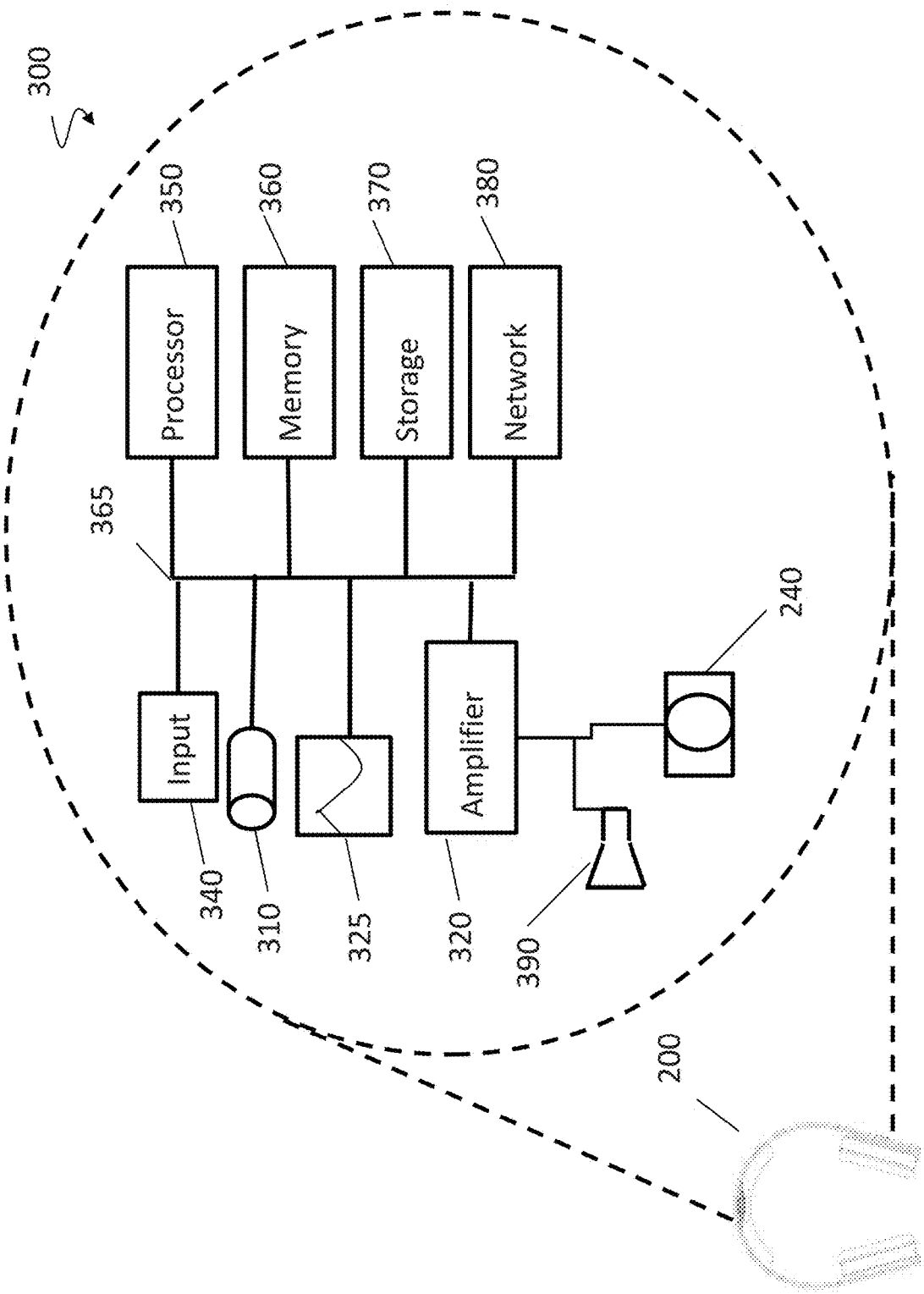

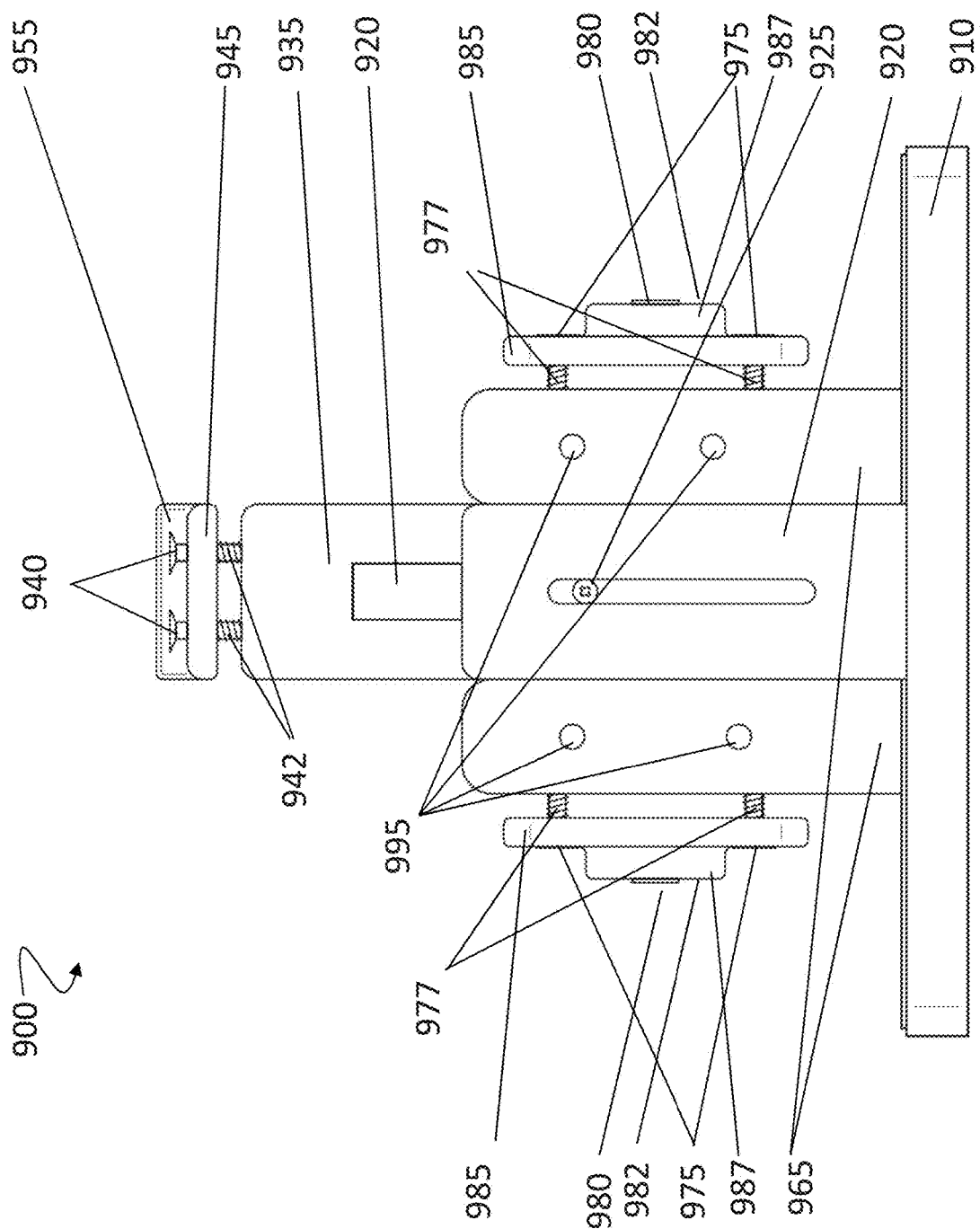

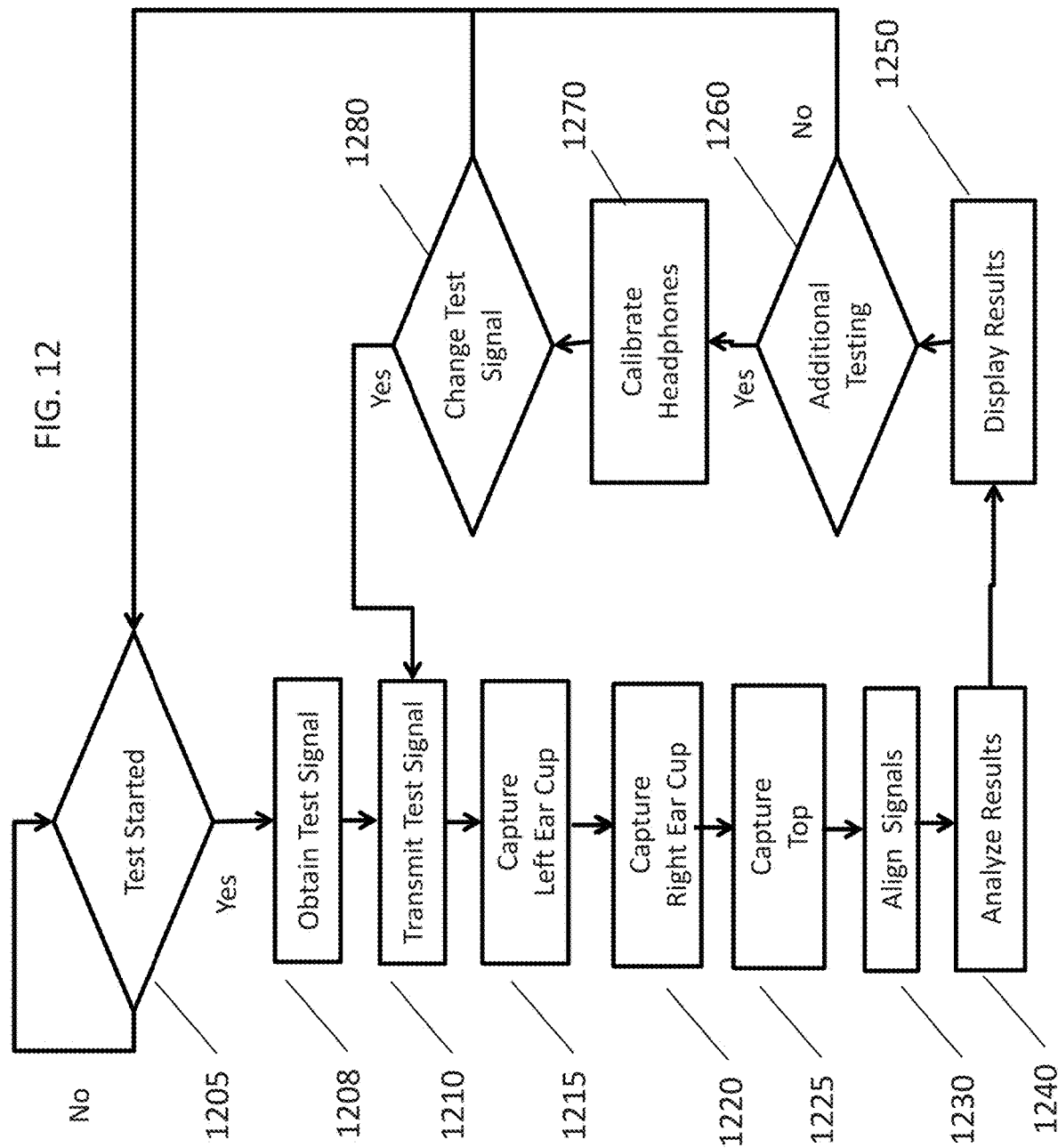

REPRODUCING AUDIO SIGNALS WITH A HAPTIC APPARATUS ON ACOUSTIC HEADPHONES AND THEIR CALIBRATION AND MEASUREMENT

CROSS REFERENCE TO RELATED APPLICATIONS

This application is a continuation of U.S. application Ser. No. 14/609,357, filed on Jan. 29, 2015, entitled "Reproducing Audio Signals with a Haptic Apparatus on Acoustic Headphones and their Calibration and Measurement," which is a continuation of U.S. application Ser. No. 14/512,679, filed on Oct. 13, 2014, entitled "Reproducing Audio Signals with a Haptic Apparatus on Acoustic Headphones and their Calibration and Measurement," now U.S. Pat. No. 8,977,376, which is a continuation-in-part of U.S. application Ser. No. 14/269,015, filed on May 2, 2014, now U.S. Pat. No. 8,892,233, entitled "Methods and Devices for Creating and Modifying Sound Profiles for Audio Reproduction Devices," which is a continuation of U.S. application Ser. No. 14/181,512, filed on Feb. 14, 2014, now U.S. Pat. No. 8,767,996, entitled "Methods and Devices for Reproducing Audio Signals with a Haptic Apparatus on Acoustic Headphones," which claims priority to U.S. Provisional Application 61/924,148, filed on Jan. 6, 2014, entitled "Methods and Devices for Reproducing Audio Signals with a Haptic Apparatus on Acoustic Headphones," all five of which are incorporated by reference herein in their entirety.

TECHNICAL FIELD

The present invention is directed to improving the auditory experience of headphone users with a haptic device and with sound profiles based on user settings, or matched to a specific song, artist, or genre.

BACKGROUND

Due to their increased wavelengths, low frequencies usually require large drivers (e.g., subwoofers) to generate higher volume. In vehicle and home stereo applications, large amplifiers are used to drive large drivers (subwoofers), which have become very popular in car audio.

Many users of mobile devices, such as iPods, tablets, and smartphones, seek an immersive audio experience. Earbuds (i.e., headphones that fit directly in the outer ear) can be power efficient, but often lack drivers sufficiently powerful to create bass. On-ear (i.e., supra-aural) or over-the-ear headphones (i.e., circumaural) can incorporate larger drivers, but can be power hungry. On-ear and over-the-ear headphones can also seal the volume of air between the ear and the headphone to increase the reproduction of bass. Users of these designs perceive a bass experience when higher Sound Pressure Levels ("SPL") are generated within the headphones by modulating the air volume between the ear and the headphones to recreate low frequency content. This reproduces an audio experience similar to what was initially recorded, but does not reproduce the same effect since the amount of air modulated is limited to that which is within the ear canal.

Increased SPL may contribute to the masking of certain sounds, thus affecting the overall auditory experience. Increased SPL can also cause temporary or permanent impairment over time.

SUMMARY

The present inventors recognized the need to create an increased bass response in a mobile headphone with minimal power demands and without increasing SPL. Further, the present inventors recognized the need to modify the sound profile of headphones to match a user, genre, artist, or song.

Various implementations of the subject matter described herein may provide one or more of the following advantages. In one or more implementations, the techniques and apparatus described herein can enhance the bass sensation. The bass sensation can be enhanced without necessarily increasing the SPL. Additionally, in one or more implementations, the techniques and apparatus described herein can operate using less power than conventional means.

In various implementations the auditory experience can be enhanced by matching the sound profile of the headphones to a particular user, genre, artist, or song.

These general and specific techniques can be implemented using an apparatus, a method, a system, or any combination of apparatuses, methods, and systems. The details of one or more implementations are set forth in the accompanying drawings and the description below. Further features, aspects, and advantages will become apparent from the description, the drawings, and the claims.

BRIEF DESCRIPTION OF THE DRAWINGS

FIG. 1 shows headphones in a user environment.

FIG. 3 shows a block diagram of headphones.

FIGS. 9A-9B show a haptic-headphone-testing test structure.

FIG. 12 shows steps for testing haptic headphones.

Like reference symbols indicate like elements throughout the specification and drawings.

DETAILED DESCRIPTION

Figure 2A:
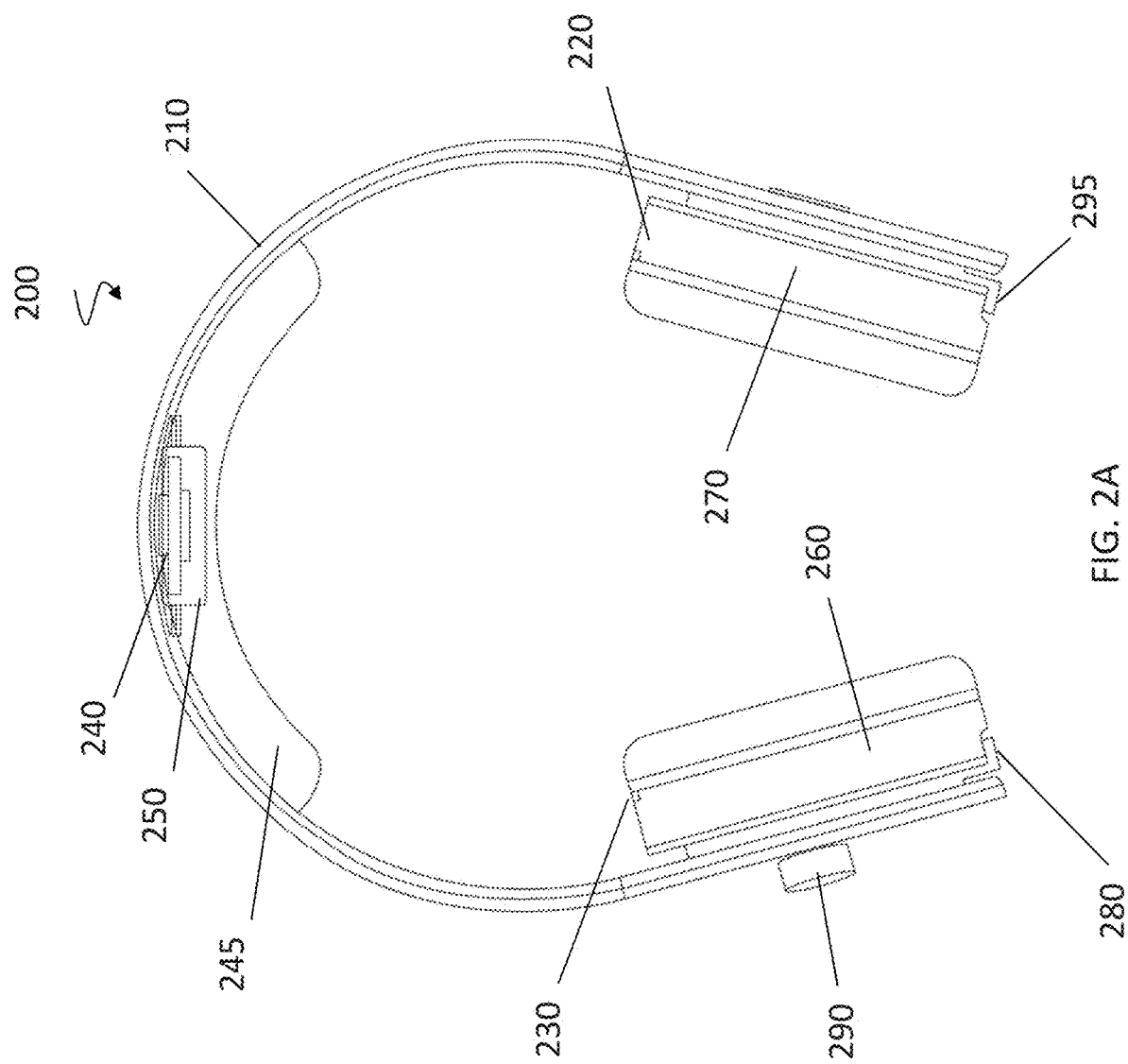
FIGS. 2A-2B show headphones including a haptic device.

FIG. 1 shows headphones in a user environment 100. User 105 is listening to headphones 120. Headphones 120 can be of the on-the-ear or over-the-ear type. Headphones 120 can be connected to mobile device 110. Mobile device 110 can be a smartphone, portable music player, portable video game or any other type of mobile device capable of generating audio entertainment. In some implementations, mobile device 110 can be connected to headphone 120 using audio cable 130, which allows mobile device 110 to transmit an audio signal to headphones 120. Such cable 130 can be a traditional audio cable that connects to mobile device 110 using a standard headphone jack. The audio signal transmitted over cable 130 can be of sufficient power to drive, i.e., create sound, at headphones 120. In other implementations, mobile device 110 can alternatively connect to headphones 120 using wireless connection 160. Wireless connection 160 can be a Bluetooth, Low Power Bluetooth, or other networking connection. Wireless connection 160 can transmit audio information in a compressed or uncompressed format. The headphones would then provide their own power source to amplify the audio data and drive the headphones.

Headphones 120 can include stereo speakers including separate drivers for the left and right ear to provide distinct audio to each ear. Headphones 120 can include a haptic device 170 to create a bass sensation by providing vibrations through the top of the headphone band. Headphone 120 can also provide vibrations through the left and right ear cups using the same or other haptic devices. Headphone 120 can include additional circuitry to process audio and drive the haptic device.

Mobile device 110 can play compressed audio files, such as those encoded in MP3 or AAC format. Mobile device 110 can decode, obtain, and/or recognize metadata for the audio it is playing back, such as through ID3 tags or other metadata. The audio metadata can include the name of the artists performing the music, the genre, and/or the song title. Mobile device 110 can use the metadata to match a particular song, artist, or genre to a predefined sound profile. Such a sound profile can include which frequencies or audio components to enhance or suppress, allowing the alteration of the playback in a way that enhances the auditory experience. The sound profiles can be different for the left and right channel. For example, if a user requires a louder sound in one ear, the sound profile can amplify that channel more. In another example, the immersion experience can be tailored to specific music genres blending the haptic sensation along with audio from the ear cup drivers. Specifically, bass heavy genres (i.e. hip-hop, dance music, and rap) can have enhanced haptic output. Although the immersive initial settings are a unique blending of haptic, audio, and headphone clamping forces, the end user can tune haptic, as well as equalization to suit his or her tastes. Genre-based sound profiles can include rock, pop, classical, hip-hop/rap, and dance music. In another implementation, the sound profile could modify the settings for Alpine's MX algorithm, a proprietary sound enhancement algorithm, or other sound enhancement algorithms known in the art.

Mobile device 110 can connect to Internet 140 over networking connection 150 to obtain the sound profile. Network connection 150 can be wired or wireless. Mobile device 110 can obtain the sound profiles in real time, such as when mobile device 110 is streaming music, or can download sound profiles in advance for any music or audio stored on mobile device 110. Mobile device 110 can allow users to tune the sound profile of their headphone to their own preferences. For example, mobile device 110 can use Alpine's Tune-It mobile application. Tune-It can allow users quickly modify their headphone devices to suite their individual tastes. Additionally, Tune-It can communicate settings and parameters (meta data) to a server on the Internet, and allow the server to associate sound settings with music genres. These associations and settings can aid in sound tuning for other productions and other modalities, like the automotive environment. For example, in the automotive environment, sound tuning parameters can be output to the vehicle sound system to meet customer sound tastes.

Audio cable 130 or wireless connection 160 can also transmit non-audio information to headphone 120. The non-audio information can include sound profiles. In other implementations, the non-audio information can include haptic information to create a haptic event using the haptic device. For example, the non-audio information could instruct the headphones to create one or more shaking sensations of particular frequencies and durations when an explosion happens in a game on mobile device 110.

Figure 2B:
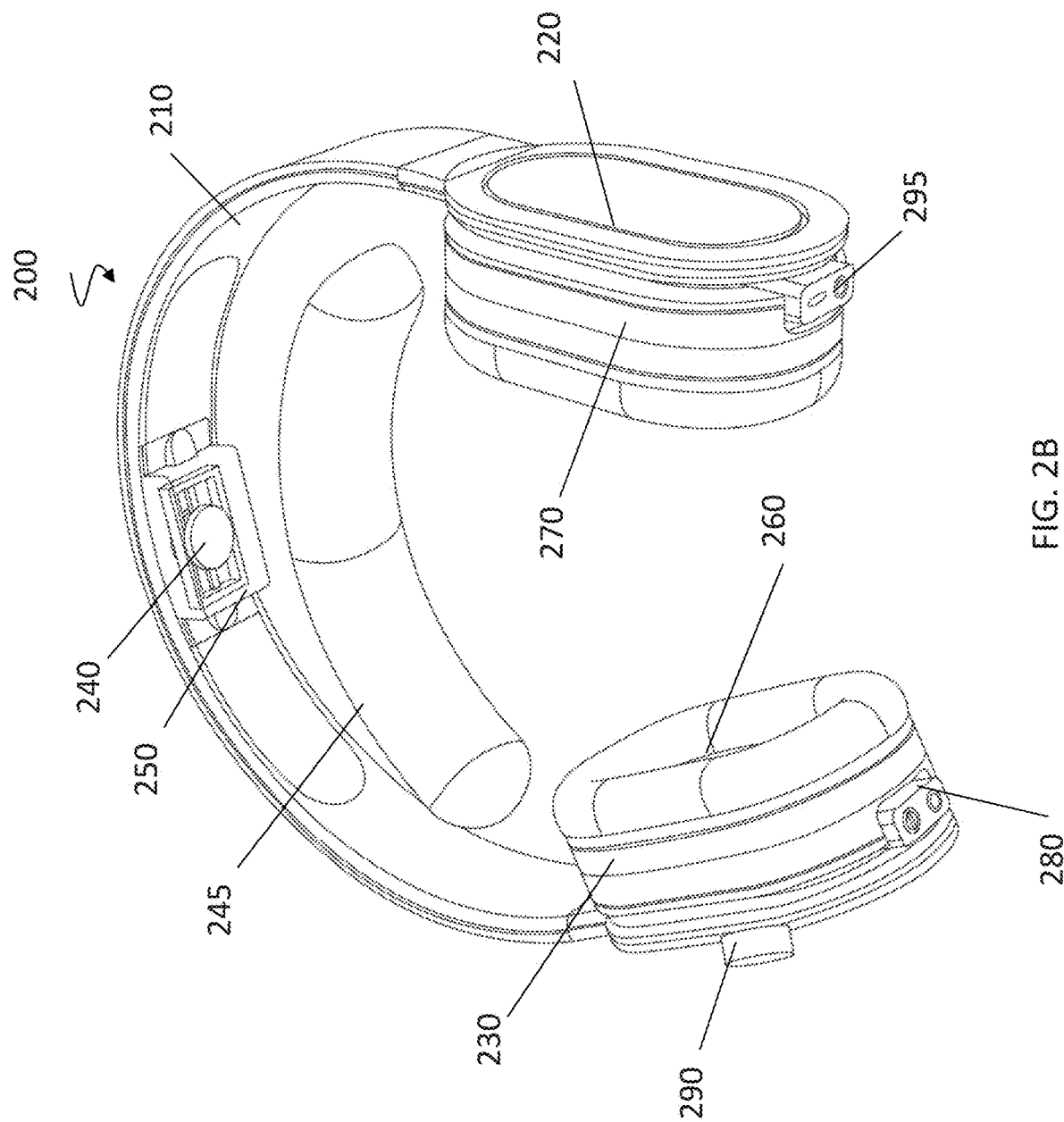

FIGS. 2A-2B show headphones including a haptic device. In both figures, headphone 200 includes headband 210. Right ear cup 220 is attached to one end of headband 210. Right ear cup 220 can include a driver that pushes a speaker to reproduce audio. Left ear cup 230 is attached to the opposite end of headband 210 and can similarly include a driver that pushes a speaker to reproduce audio. The top of headband 210 can include haptic device 240. Haptic device 240 can be covered by cover 250. Padding 245 can cover the cover 250. Right ear cup 220 can include a power source 270 and recharging jack 295. Left ear cup 230 can include signal processing components 260 inside of it, and headphone jack 280. Left ear cup 230 can have control 290 attached. Headphone jack 280 can accept an audio cable to receive audio signals from a mobile device. Control 290 can be used to adjust audio settings, such as to increase the bass response or the haptic response. In other implementations, the location of power source 270, recharging jack 295, headphone jack 280, and signal processing components 260 can swap ear cups, or be combined into either single ear cup.

Multiple components are involved in both the haptic and sound profile functions of the headphones. These functions are discussed on a component-by-component basis below.

Power source 270 can be a battery or other power storage device known in the art. In one implementation it can be one or more batteries that are removable and replaceable. For example, it could be an AAA alkaline battery. In another implementation it could be a rechargeable battery that is not removable. Right ear cup 220 can include recharging jack 295 to recharge the battery. Recharging jack 295 can be in the micro USB format. Power source 270 can provide power to signal processing components 260. Power source 270 can provide power to signal processing components 260. Power source 270 can last at least 10 hours.

Signal processing components 260 can receive stereo signals from headphone jack 280 or through a wireless networking device, process sound profiles received from headphone jack 280 or through wireless networking, create a mono signal for haptic device 240, and amplify the mono signal to drive haptic device 240. In another implementation, signal processing components 260 can also amplify the right audio channel that drives the driver in the right ear cup and amplify the left audio channel that drives the left audio cup. Signal processing components 260 can deliver a low pass filtered signal to the haptic device that is mono in nature but derived from both channels of the stereo audio signal. Because it can be difficult for users to distinguish the direction or the source of bass in a home or automotive environment, combining the low frequency signals into a mono signal for bass reproduction can simulate a home or car audio environment. In another implementation, signal processing components 260 can deliver stereo low-pass filtered signals to haptic device 240.

In one implementation, signal processing components 260 can include an analog low-pass filter. The analog low-pass filter can use inductors, resistors, and/or capacitors to attenuate high-frequency signals from the audio. Signal processing components 260 can use analog components to combine the signals from the left and right channels to create a mono signal, and to amplify the low-pass signal sent to haptic device 240.

In another implementation, signal processing components 260 can be digital. The digital components can receive the audio information, via a network. Alternatively, they can receive the audio information from an analog source, convert the audio to digital, low-pass filter the audio using a digital signal processor, and provide the low-pass filtered audio to a digital amplifier.

Control 290 can be used to modify the audio experience. In one implementation, control 290 can be used to adjust the volume. In another implementation, control 290 can be used to adjust the bass response or to separately adjust the haptic response. Control 290 can provide an input to signal processing components 260.

Haptic device 240 can be made from a small transducer (e.g. a motor element) which transmits low frequencies (e.g. 1 Hz-100 Hz) to the headband. The small transducer can be less than 1.5" in size and can consume less than 1 watt of power. Haptic device 240 can be an off-the shelf haptic device commonly used in touch screens or for exciters to turn glass or plastic into a speaker. Haptic device 240 can use a voice coil or magnet to create the vibrations.

Haptic device 240 can be positioned so it is displacing directly on the headband 210. This position allows much smaller and thus power efficient transducers to be utilized. The housing assembly for haptic device 240, including cover 250, is free-floating, which can maximize articulation of haptic device 240 and reduces dampening of its signal.

The weight of haptic device 240 can be selected as a ratio to the mass of the headband 210. The mass of haptic device 240 can be selected directly proportional to the rigid structure to enable sufficient acoustic and mechanical energy to be transmitted to the ear cups. If the mass of haptic device 240 were selected to be significantly lower than the mass of the headband 210, then headband 210 would dampen all mechanical and acoustic energy. Conversely, if the mass of haptic device 240 were significantly higher than the mass of the rigid structure, then the weight of the headphone would be unpleasant for extended usage and may lead to user fatigue. Haptic device 240 is optimally placed in the top of headband 210. This positioning allows the gravity of the headband to generate a downward force that increases the transmission of mechanical vibrations from the haptic device to the user. The top of the head also contains a thinner layer of skin and thus locating haptic device 240 here provides more proximate contact to the skull. The unique position of haptic device 240 can enable the user to experience an immersive experience that is not typically delivered via traditional headphones with drivers located merely in the headphone cups.

The haptic device can limit its reproduction to low frequency audio content. For example, the audio content can be limited to less than 100 Hz. Vibrations from haptic device 240 can be transmitted from haptic device 240 to the user through three contact points: the top of the skull, the left ear cup, and the right ear cup. This creates an immersive bass experience. Because headphones have limited power storage capacities and thus require higher energy efficiencies to satisfy desired battery life, the use of a single transducer in a location that maximizes transmission across the three contact points also creates a power-efficient bass reproduction.

Cover 250 can allow haptic device 240 to vibrate freely. Headphone 200 can function without cover 250, but the absence of cover 250 can reduce the intensity of vibrations from haptic device 240 when a user's skull presses too tightly against haptic device 240.

Padding 245 covers haptic device 240 and cover 250. Depending on its size, shape, and composition, padding 245 can further facilitate the transmission of the audio and mechanical energy from haptic device 240 to the skull of a user. For example, padding 245 can distribute the transmission of audio and mechanical energy across the skull based on its size and shape to increase the immersive audio experience. Padding 245 can also dampen the vibrations from haptic device 240.

Headband 210 can be a rigid structure, allowing the low frequency energy from haptic device 240 to transfer down the band, through the left ear cup 230 and right ear cup 220 to the user. Forming headband 210 of a rigid material facilitates efficient transmission of low frequency audio to ear cups 230 and 220. For example, headband 210 can be made from hard plastic like polycarbonate or a lightweight metal like aluminum. In another implementation, headband 210 can be made from spring steel. Headband 210 can be made such that the material is optimized for mechanical and acoustic transmissibility through the material. Headband 210 can be made by selecting specific type materials as well as a form factor that maximizes transmission. For example, by utilizing reinforced ribbing in headband 210, the amount of energy dampened by the rigid band can be reduced and enable more efficient transmission of the mechanical and acoustic frequencies to be passed to the ear cups 220 and 230.

Headband 210 can be made with a clamping force measured between ear cups 220 and 230 such that the clamping force is not so tight as to reduce vibrations and not so loose as to minimize transmission of the vibrations. The clamping force can be in the range of 300 g to 600 g.

Ear cups 220 and 230 can be designed to fit over the ears and to cover the whole ear. Ear cups 220 and 230 can be designed to couple and transmit the low frequency audio and mechanical energy to the user's head. Ear cups 220 and 230 may be static. In another implementation, ear cups 220 and 230 can swivel, with the cups continuing to be attached to headband 210 such that they transmit audio and mechanical energy from headband 210 to the user regardless of their positioning.

Vibration and audio can be transmitted to the user via multiple methods including auditory via the ear canal, and bone conduction via the skull of the user. Transmission via bone conduction can occur at the top of the skull and around the ears through ear cups 220 and 230. This feature creates both an aural and tactile experience for the user that is similar to the audio a user experiences when listening to audio from a system that uses a subwoofer. For example, this arrangement can create a headphone environment where the user truly feels the bass.

FIG. 3 shows a block diagram of a headphone. FIG. 3 presents headphone system 300 that can be used to implement the techniques described herein for an enhanced audio experience. Headphone system 300 can be implemented inside of headphones 200. Headphone system 300 can be part of signal processing components 260. Headphones 200 can include bus 365 that connects the various components. Bus 365 can be composed of multiple channels or wires, and can include one or more physical connections to permit unidirectional or omnidirectional communication between two or more of the components in headphone system 300. Alternatively, components connected to bus 365 can be connected to headphone system 300 through wireless technologies such as Bluetooth, Wifi, or cellular technology.

An input 340 including one or more input devices can be configured to receive instructions and information. For example, in some implementations input 340 can include a number of buttons. In some other implementations input 340 can include one or more of a touch pad, a touch screen, a cable interface, and any other such input devices known in the art. Input 340 can include knob 290. Further, audio and image signals also can be received by the headphone system 300 through the input 340.

Headphone jack 310 can be configured to receive audio and/or data information. Audio information can include stereo or other multichannel information. Data information can include metadata or sound profiles. Data information can be sent between segments of audio information, for example between songs, or modulated to inaudible frequencies and transmitted with the audio information.

Further, headphone system 300 can include network interface 380. Network interface 380 can be wired or wireless. A wireless network interface 380 can include one or more radios for making one or more simultaneous communication connections (e.g., wireless, Bluetooth, low power Bluetooth, cellular systems, PCS systems, or satellite communications). Network interface 380 can receive audio information, including stereo or multichannel audio, or data information, including metadata or sound profiles.

An audio signal, user input, metadata, other input or any portion or combination thereof, can be processed in headphone system 300 using the processor 350. Processor 350 can be used to perform analysis, processing, editing, playback functions, or to combine various signals, including adding metadata to either or both of audio and image signals. Processor 350 can use memory 360 to aid in the processing of various signals, e.g., by storing intermediate results. Processor 350 can include A/D processors to convert analog audio information to digital information. Processor 350 can also include interfaces to pass digital audio information to amplifier 320. Processor 350 can process the audio information to apply sound profiles, create a mono signal and apply low pass filter. Processor 350 can also apply Alpine's MX algorithm.

Processor 350 can low pass filter audio information using an active low pass filter to allow for higher performance and the least amount of signal attenuation. The low pass filter can have a cut off of approximately 80 Hz-100 Hz. The cut off frequency can be adjusted based on settings received from input 340 or network 380. Processor 350 can parse metadata and request sound profiles via network 380.

In another implementation, passive filter 325 can combine the stereo audio signals into a mono signal, apply the low pass filter, and send the mono low pass filter signal to amplifier 320.

Memory 360 can be volatile or non-volatile memory. Either or both of original and processed signals can be stored in memory 360 for processing or stored in storage 370 for persistent storage. Further, storage 370 can be integrated or removable storage such as Secure Digital, Secure Digital High Capacity, Memory Stick, USB memory, compact flash, xD Picture Card, or a hard drive.

The audio signals accessible in headphone system 300 can be sent to amplifier 320. Amplifier 320 can separately amplify each stereo channel and the low-pass mono channel. Amplifier 320 can transmit the amplified signals to speakers 390 and haptic device 240. In another implementation, amplifier 320 can solely power haptic device 240. Amplifier 320 can consume less than 2.5 Watts.

Figure 4:
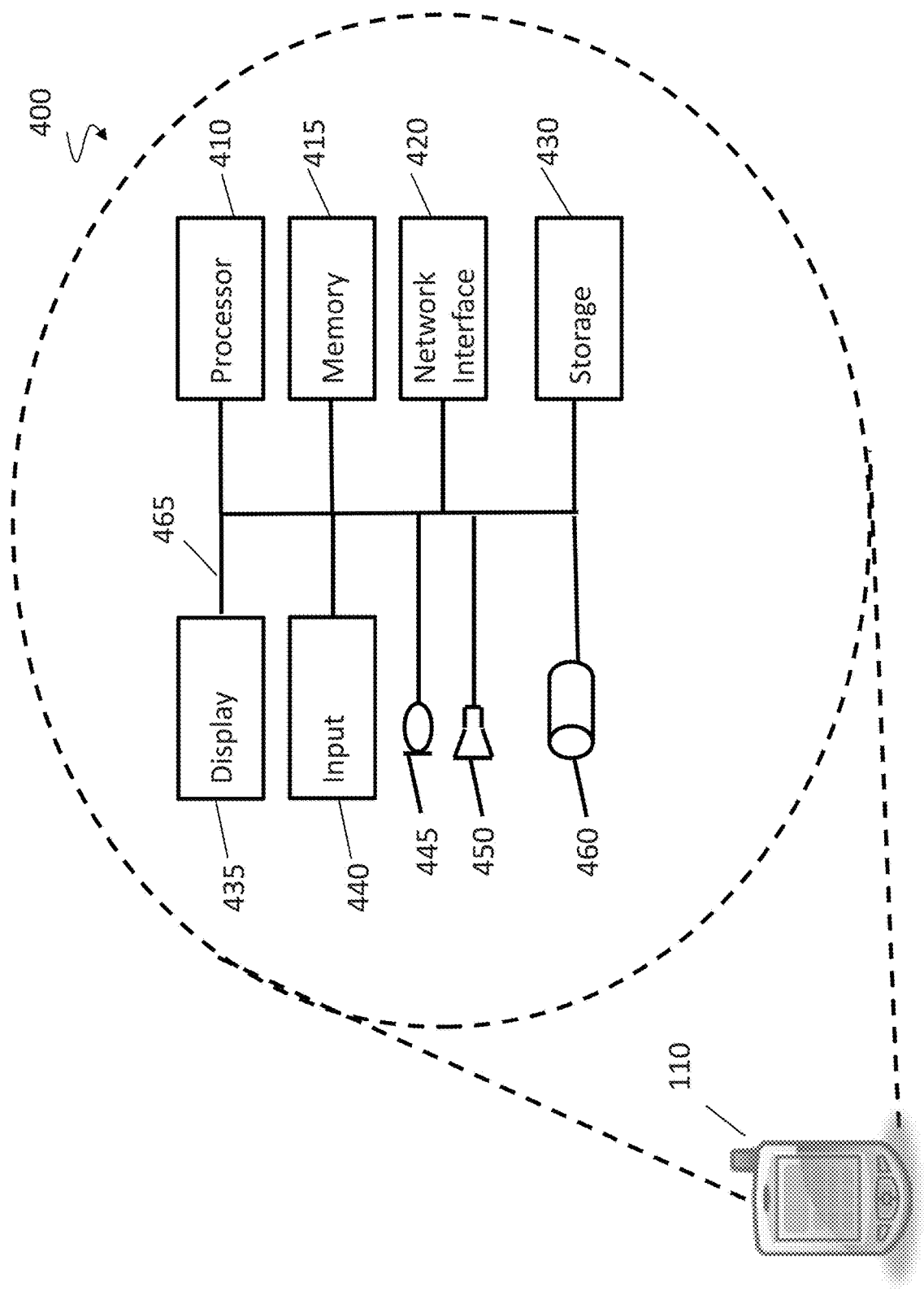
FIG. 4 shows a block diagram of a mobile device.

FIG. 4 shows a block diagram of mobile device 110. FIG. 4 presents a computer system 400 that can be used to implement the techniques described herein for sharing digital media. Computer system 400 can be implemented inside of mobile device 110. Bus 465 can include one or more physical connections and can permit unidirectional or omnidirectional communication between two or more of the components in the computer system 400. Alternatively, components connected to bus 465 can be connected to computer system 400 through wireless technologies such as Bluetooth, Wifi, or cellular technology. The computer system 400 can include a microphone 445 for receiving sound and converting it to a digital audio signal. The microphone 445 can be coupled to bus 465, which can transfer the audio signal to one or more other components. Computer system 400 can include a headphone jack 460 for transmitting audio and data information to headphones and other audio devices.

An input 440 including one or more input devices also can be configured to receive instructions and information. For example, in some implementations input 440 can include a number of buttons. In some other implementations input 440 can include one or more of a mouse, a keyboard, a touch pad, a touch screen, a joystick, a cable interface, and any other such input devices known in the art. Further, audio and image signals also can be received by the computer system 400 through the input 440.

Further, computer system 400 can include network interface 420. Network interface 420 can be wired or wireless. A wireless network interface 420 can include one or more radios for making one or more simultaneous communication connections (e.g., wireless, Bluetooth, low power Bluetooth, cellular systems, PCS systems, or satellite communications). A wired network interface 420 can be implemented using an Ethernet adapter or other wired infrastructure.

An audio signal, image signal, user input, metadata, other input or any portion or combination thereof, can be processed in the computer system 400 using the processor 410. Processor 410 can be used to perform analysis, processing, editing, playback functions, or to combine various signals, including parsing metadata to either or both of audio and image signals.

For example, processor 410 can parse metadata from a song or video stored on computer system 400 or being streamed across network interface 420. Processor 410 can use the metadata to request sound profiles from the Internet through network interface 420 or from storage 430 for the specific song or video based on the artist, genre, or specific song or video. Processor 410 can then use input received from input 440 to modify a sound profile according to a user's preferences. Processor 410 can then transmit the sound profile to a headphone connected through network interface 420 or headphone jack 460 and/or store a new sound profile in storage 430. Processor 410 can run applications on computer system 400 like Alpine's Tune-It mobile application, which can adjust sound profiles. The sound profiles can be used to adjust Alpine's MX algorithm.

Processor 410 can use memory 415 to aid in the processing of various signals, e.g., by storing intermediate results. Memory 415 can be volatile or non-volatile memory. Either or both of original and processed signals can be stored in memory 415 for processing or stored in storage 430 for persistent storage. Further, storage 430 can be integrated or removable storage such as Secure Digital, Secure Digital High Capacity, Memory Stick, USB memory, compact flash, xD Picture Card, or a hard drive.

Image signals accessible in computer system 400 can be presented on a display device 435, which can be an LCD display, printer, projector, plasma display, or other display device. Display 435 also can display one or more user interfaces such as an input interface. The audio signals available in computer system 400 also can be presented through output 450. Output device 450 can be a speaker. Headphone jack 460 can also be used to communicate digital or analog information, including audio and sound profiles.

Figure 5:
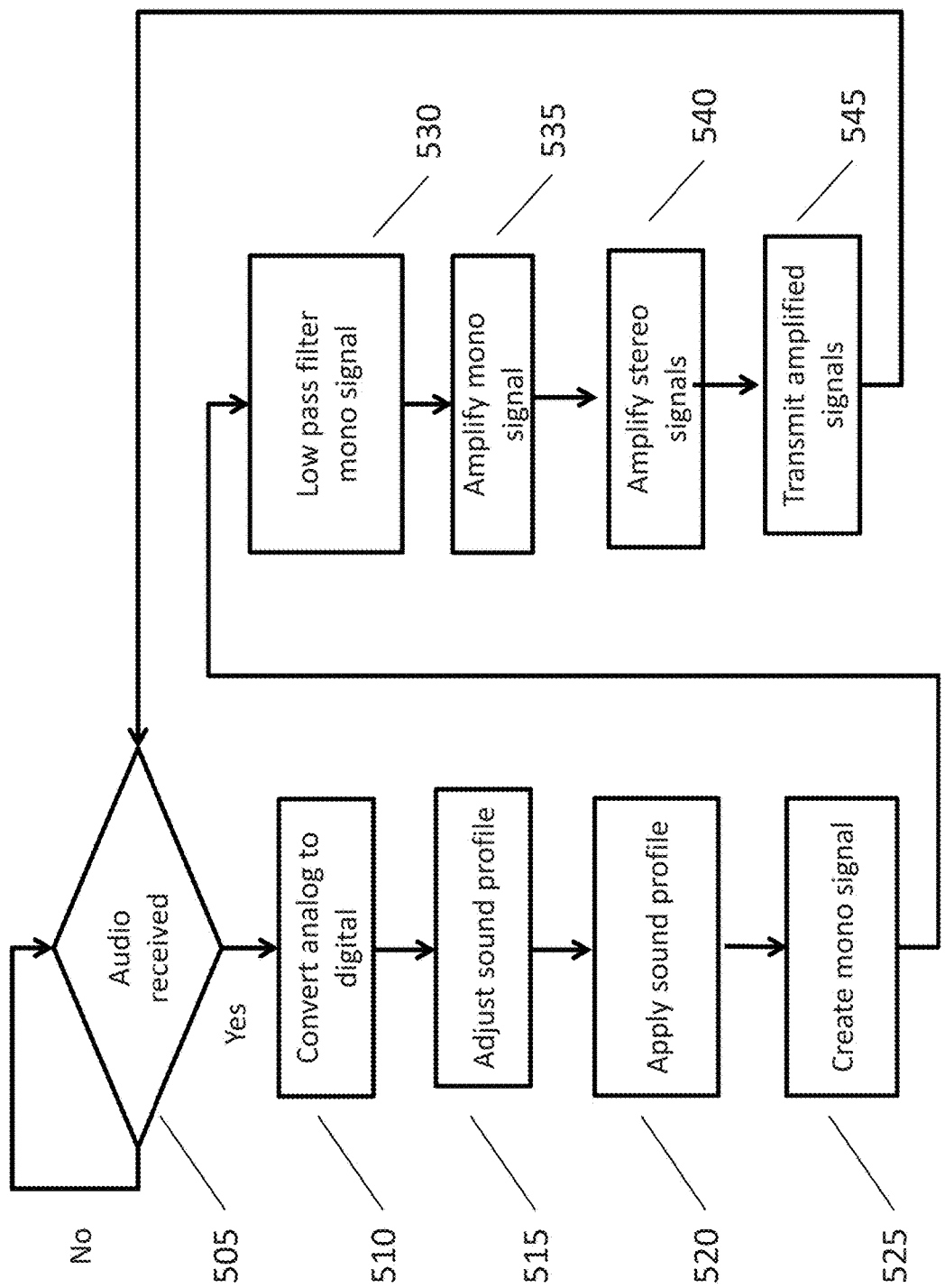
FIG. 5 shows steps for processing information for reproduction in headphones.

FIG. 5 shows steps for processing information for reproduction in headphones. Headphones can monitor a connection to determine when audio is received, either through an analog connection or digitally (505). When audio is received, any analog audio can be converted from analog to digital (510) if a digital filter is used. The sound profile can be adjusted according to user input (e.g., a control knob) on the headphones (515). The headphones can apply a sound profile (520). The headphones can then create a mono signal (525) using known mixing techniques. The mono signal can be low-pass filtered (530). The low-pass filtered mono signal can be amplified (535). In some implementations (e.g., when the audio is digital), the stereo audio signal can also be amplified (540). The amplified signals can then be transmitted to their respective drivers (545). For example, the low-pass filtered mono signal can be sent to a haptic device and the amplified left and right channel can be sent to the left and right drivers respectively.

FIG. 3 shows a system capable of performing these steps. The steps described in FIG. 5 need not be performed in the order recited and two or more steps can be performed in parallel or combined. In some implementations, other types of media also can be shared or manipulated, including audio or video.

Figure 6:
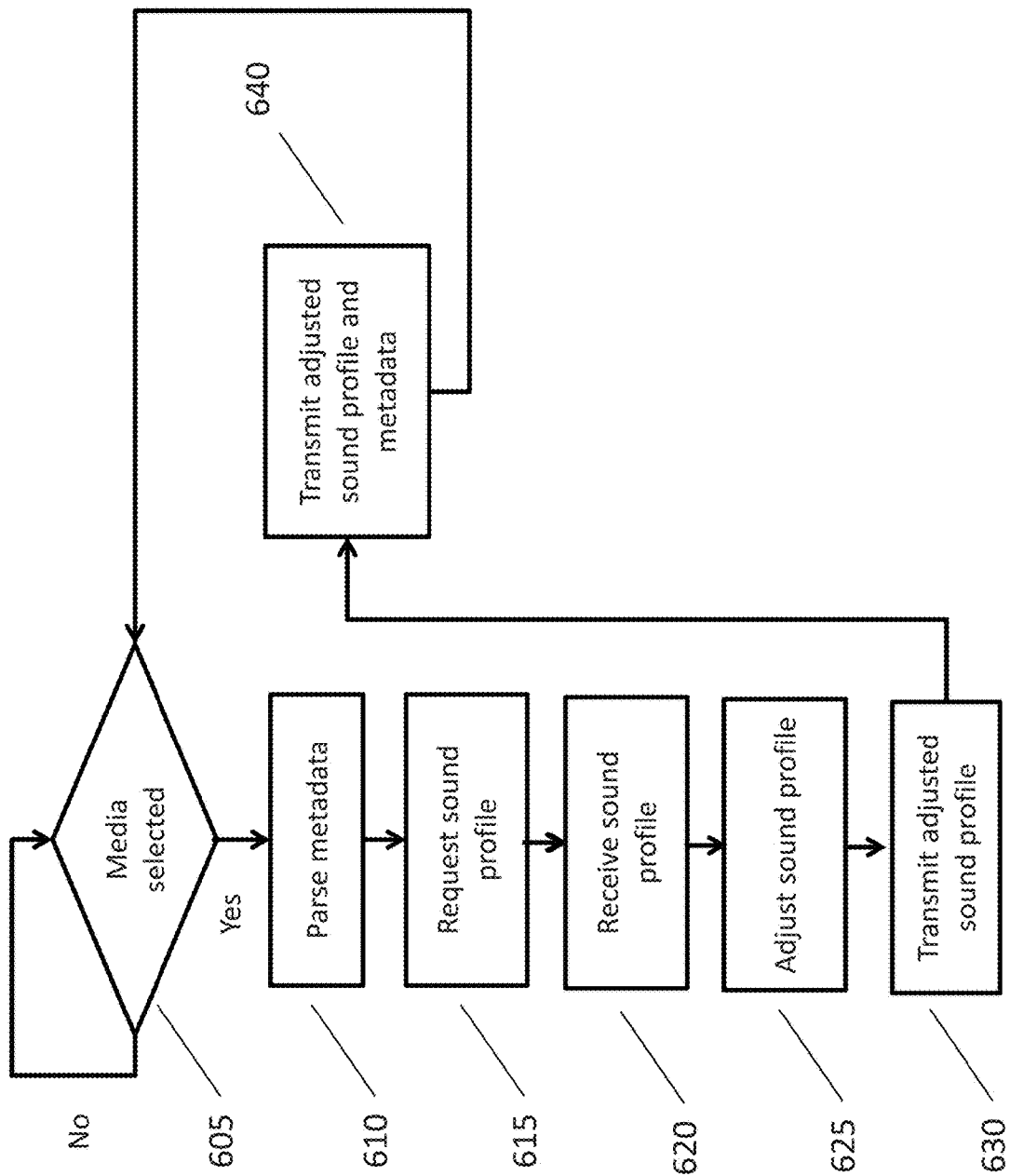
FIG. 6 shows steps for obtaining and applying sound profiles.

FIG. 6 shows steps for obtaining and applying sound profiles. A mobile device, such as mobile device 110, can wait for media to be selected for playback or loaded onto a mobile device (605). The media can be a song, album, game, or movie. Once the media is selected, metadata for the media is parsed to determine if the media contains music, voice, or a movie, and what additional details are available such as the artist, genre or song name (610). The metadata is used to request a sound profile from a server over a network, such as the Internet, or from local storage (615). For example, Alpine could maintain a database of sound profiles matched to various types of media and matched to a particular model of headphones. The sound profile could contain parameters for increasing or decreasing various frequency bands and other sound parameters for enhancing portions of the audio, such as parameters for modifying Alpine's MX algorithm. The sound profile is received (620) and then adjusted to a particular user's preference (625). The adjusted sound profile is then transmitted (630) to a reproduction device, such as a pair of headphones. The adjusted profile and its associated metadata can also be transmitted (640) to the server where the sound profile, its metadata and the association is stored for later analysis.

FIG. 4 shows a system capable of performing these steps. The steps described in FIG. 6 could also be performed in headphones connected to a network without the need of an additional mobile device. The steps described in FIG. 6 need not be performed in the order recited and two or more steps can be performed in parallel or combined. In some implementations, other types of media also can be shared or manipulated, including audio or video.

Figure 7:
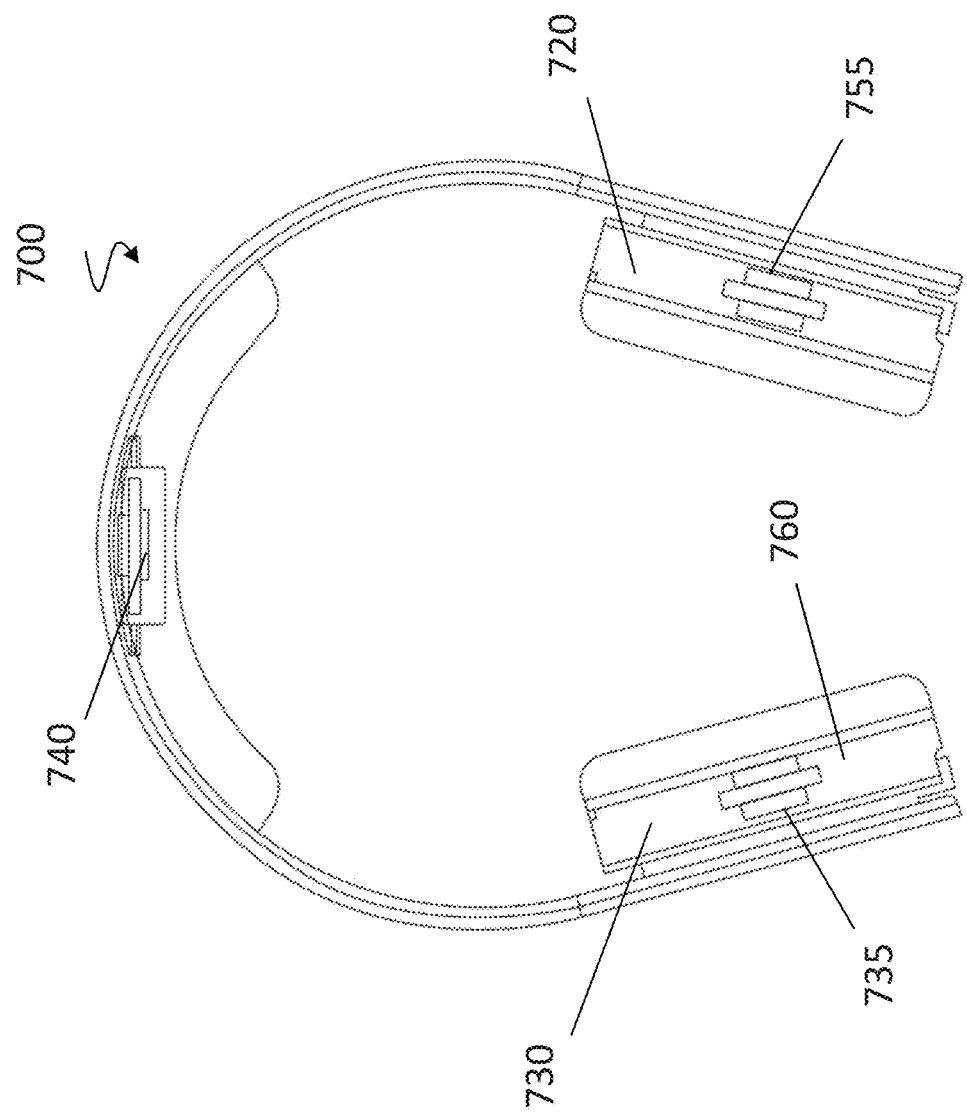
FIG. 7 shows another set of headphones including multiple haptic devices.

FIG. 7 shows another headphone including multiple haptic devices. FIG. 7 shows a headphone 700. Headphone 700 can have components similar to headphone 200 and can function similarly. The details regarding headphone 700 are incorporated herein. Headphone 700 can include haptic device 740. Headphone 700 can include a right haptic device 755 attached to right ear cup 720. Headphone 700 can include a left haptic device 735 attached to left ear cup 730. Signal processing components 760 can include additional components to separately process low pass signals for the left and right channels, separately amplify those signals, and provide them to the left and right haptic devices 735 and 755, respectively. Signal processing components 760 must take care to avoid phase issues that can occur in conjunction with the creation of the mono signal. The additional haptic devices can allow for increased bass sensations isolated to an individual ear. The ability to separately generate vibrations for each ear is particularly useful in gaming environments and with signals in the higher end of the low frequency spectrum.

Figure 8:
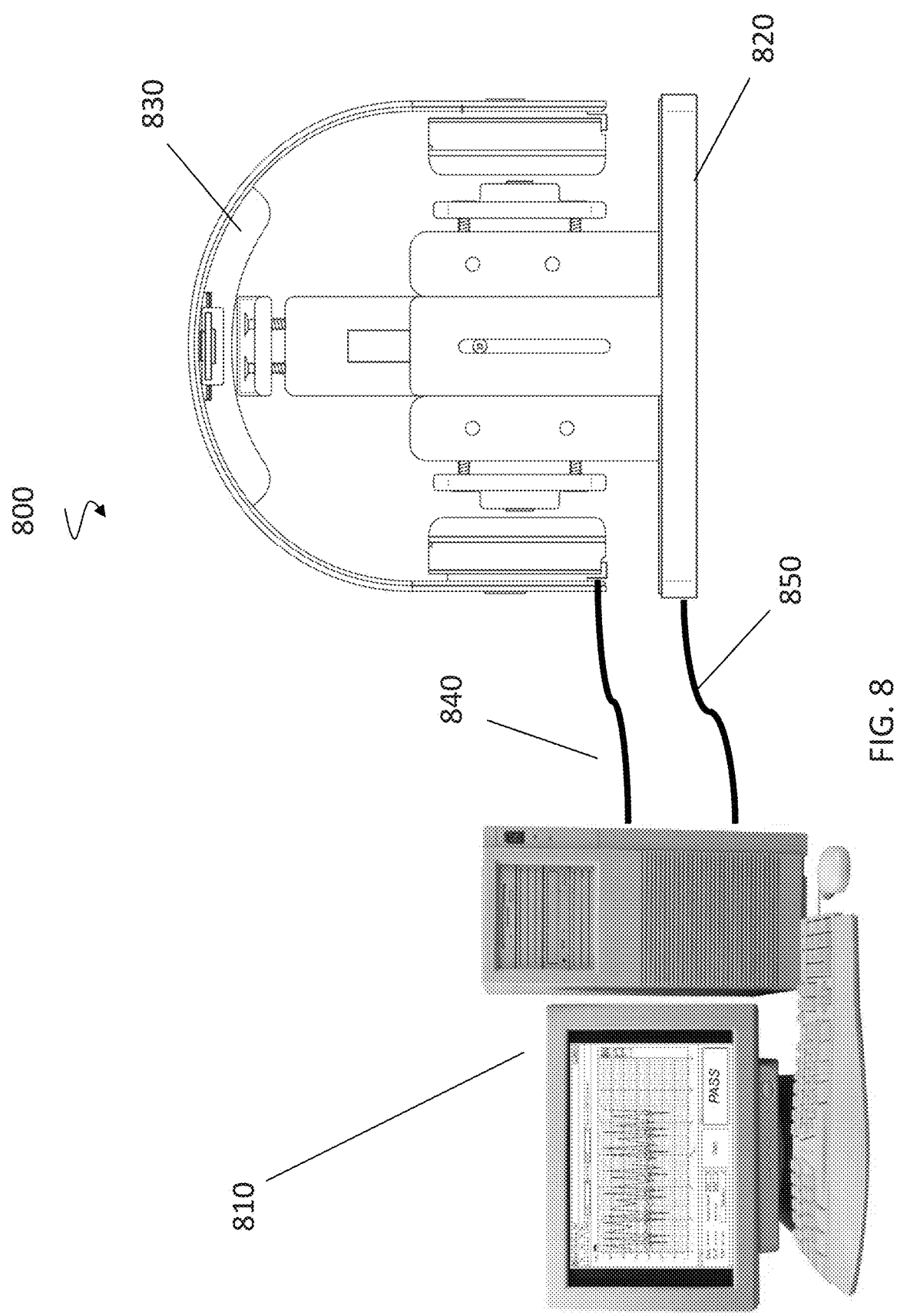
FIG. 8 shows a haptic-headphone-testing environment.

FIG. 8 shows a haptic-headphone-testing environment 800. Haptic-headphone-testing environment 800 can determine whether a haptic headphone has been assembled correctly by measuring the amplitude at one or more specific calibrated frequencies to determine whether all components of the headphone have been assembled to the correct tolerance. Haptic-headphone-testing environment 800 can utilize a frequency sweep as an input signal and can observe the vibrations exerted by the headphone throughout the sweep to determine whether the headphone has any artifacts generated from loose or defective parts. Haptic-headphone-testing environment 800 can also be used to calibrate a haptic headphone.

Haptic-headphone-testing environment 800 includes headphone 830. Headphone 830 can be the type describe above as headphone 120, headphone 200, or headphone 700, and can have a haptic device that generates haptic sensations. Headphone 830 can be placed on test structure 820 as shown.

Test structure 820 can include vibration sensors that monitor the haptic vibrations generated by headphone 830 at specific points on headphone 830. The vibration sensors can include accelerometers or other transducers capable of measuring vibrations. The vibration sensors can be positioned at points where a headphone is designed to transmit vibrations to the user-haptic sensation transfer points. For example, the haptic sensation transfer points for headphone 120, headphone 200, or headphone 700 would be at the top of the headband at the left ear cup, and/or the right ear cup. In another embodiment, the haptic sensation transfer points could be at just the right and left ear cups. Or, for earbuds, the haptic sensation transfer points could be at the tip of the ear bud. Test structure 820 call be used to measure and calibrate a haptic response of headphone 830.

Haptic-headphone testing device 810 can communicate with headphone 830 through cable 840 and with test structure 820 through cable 850. In another embodiment, haptic-headphone testing device 810 can wirelessly connect to headphone 830 and test structure 820. Haptic-headphone testing device 810 can send audio signals to headphone 830. When headphone 830 creates haptic sensations or vibrations, those vibrations can be sensed by the vibration sensors on test structure 820 and that information can be sent back to haptic-headphone testing device 810. Haptic-headphone testing device 810 can then analyze the signals from the vibration sensors to determine if the headphone has been properly manufactured and assembled. Haptic-headphone testing device 810 can also recalibrate the settings in headphone 830, including gain to each driver and/or the haptic device, the crossover for the haptic device, the equalization settings for each driver, or other reproduction settings and then retest the headphone with those settings.

In another embodiment, test structure 820 can include microphone 982 on the plates near the ear cups of headphone 830. Haptic-headphone device 810 can also analyze the acoustic signals received by the microphones to determine if headphone 830 is correctly assembled. Haptic-headphone testing device 810 can then recalibrate settings in headphone 830 to improve the acoustic reproduction of headphone 830 and to better blend the acoustic and haptic reproduction of headphone 830. Recalibrated settings can include changing various reproduction settings, including the gain on the haptic device, left driver, right driver, equalizer settings, or the crossover frequency for the haptic device or the drivers.

Figure 9A:
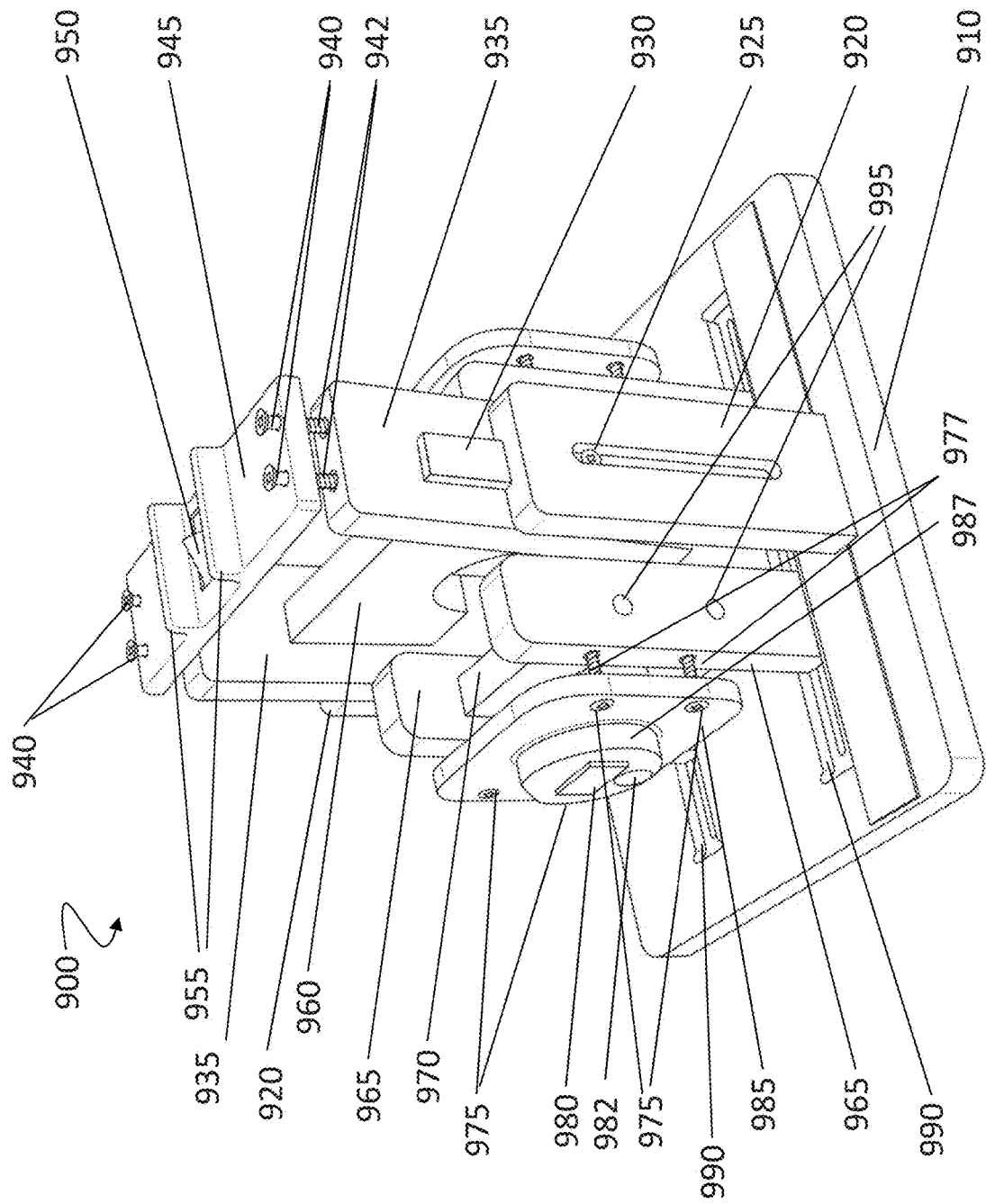

FIGS. 9A-9B show a haptic-headphone-testing structure. FIGS. 9A-9B show a headband assembly (e.g. 920, 925, 930, 935, 940, 942). Test structure 900, as described below in more detail, includes multiple accelerometers placed at haptic sensation transfer points and microphones placed near driver locations. Test structure 900 can include base 910. Headband column base 920 can be attached to base 910. Headband column extension 935 can include headband column extension tongue 930, which corresponds to a groove (not shown) on the backside of headband column base 920. Headband column extension tongue 930 and its corresponding groove can allow headband extension 935 to be adjusted vertically. Screw 925 can be loosened to allow headband column extension tongue 930 to slide in its corresponding groove or can be tightened once the correct height is achieved. A corresponding screw 925 (not shown) for the backside of testing structure 900 can also be used in a likewise manner. Headband bridge 960 can connect the two headband column extensions 935 and provide additional stability. Headband plate 945 can sit atop the two headband column extensions 935. Headband plate 945 can be loosely secured by rods 940. Rods 940 can be screws with a smooth shaft towards the head of the screw. Rods 940 can allow headband plate 945 to move up and down. Rods 940 can be flush against headband plate 945 or rise above the top of headband plate 945. Springs 942 can be inserted on rods 940 and in between headband plate 945 and headband column extension 935. Springs 942 can be made of steel. Spring 942 can push up on headband plate 945 and allow headband plate 945 to freely float and vibrate. Headband plate 945 can include headband plate saddle 955. Headband plate saddle 955 can be used to settle the headband of headphones placed on testing structure 900 and can keep them in place while the headphones are providing haptic feedback. Headband vibration sensor 950 can be used to measure the vibrations provided through the headband of a headphone, which are intended to measure the vibrations that would ordinarily be transmitted to the top of a user's skull.

FIG. 9A shows one ear-cup assembly (e.g., 965, 970, 975, 977, 980, and 985) which will be described below in more detail. FIG. 9B shows a side-view that demonstrates there is a corresponding ear-cup assembly on the opposite side of test structure 900. The following description focuses on one ear-cup assembly (i.e., the left one) with the understanding that there is a nearly identical ear-cup assembly (i.e., the right one) on the opposite side as show in FIG. 9B.

Ear cup column 965 can sit in groove 990 and can slide back and forth in groove 990. There can be a screw attached to the bottom of ear cup 965 (not shown) that can be tightened to secure the position of ear cup column 965 in groove 990. Ear cup bridge 970 can connect two of the ear cup columns 965 to create a more rigid and study ear cup assembly. Ear cup bridge 970 can be secured to ear cup column 965 through screws in ear up column countersinks 995. Ear cup plate 985 sits is adjacent to ear cup columns 965. Ear cup plate 985 can be loosely secured to ear cup columns 965 by rods 975. Rods 975 can be screws with a smooth shaft towards the head of the screw. Rods 975 can allow ear cup plate 985 to move sideways. Rods 940 can be flush against headband plate 945 or stick outside the outermost side of ear cup plate 945. Springs 977 can be inserted on rods 940 and in between ear cup plate 985 and ear cup columns 965. Springs 977 can be made of steel. Spring 977 can push out ear cup plate 985 and allow ear cup plate 985 to freely float and vibrate. Ear cup plate 985 can include ear cup plate flange 987. Ear cup plate flange 987 can be used to settle the ear cup of headphones placed on testing structure 900 and can keep the ear cup in place while the headphones are providing haptic feedback. Ear cup vibration sensor 980 can be used to measure the vibrations provided through the ear cup of a headphone being tested, which is intended to measure the vibrations that would ordinarily be transmitted to the user's skull around the user's ear.

Test structure 900 can be adjusted to fit different sizes of headphones. Sliding ear cup column 965 of one of the ear-cup assemblies or for both ear-cup assemblies allows the user to position the ear cup assemblies such that they sit tightly against the ear cups of the headphone being assembled. This can ensure that there is a specific amount of pressure between each ear cup plate 985 and the ear cup of the headphone being tested. For example, test structure 900 can be adjusted and/or calibrated so that when a particular headphone is tested it is in a stretched state exerting a specific clamping force of 700 g between the left ear cup and right ear cup of the headphones. In another embodiment, test structure 900 can include pressure sensors in ear cup plates 985 that measure and transmit the amount of clamping force. The pressure sensors can be connected to the haptic-headphone testing device 810 as described below.

Similarly, headband column extension tongue 930 can slide in its corresponding groove to achieve a specific height that provides the right amount of pressure between headband plate 945 and the headband of the headphone being tested. For example, test structure 900 can be adjusted and/or calibrated so that when a particular headphone is tested it is exerting a specific force approximately equal to the weight of the headphone on headband plate 945. In another embodiment, test structure 900 can include pressure sensors in headband plate 945 that measure and transmit the amount of force. The pressure sensors can be connected to the haptic-headphone testing device 810 as described below.

In another embodiment, test structure 900 can be made for a specific headphone and be non-adjustable. For example, parts 910, 920, 930, 920, 965, and 970 could be printed as a single piece using a 3D printer or cast from a single block of plastic or metal by a machine. In yet another embodiment, test structure 900 can be made to be adjustable in only the horizontal direction. In yet another embodiment, test structure 900 can be made to be adjustable in only the vertical direction.

Base 910 can be made of metal, a heavy composite material, or a lighter material if secured to something larger and/or heavier. Headband plate 945 and ear cup plate 985 can be made of lightweight plastic or other lightweight materials and can be rigid. The columns, column extensions, and bridges (i.e., 920, 930, 935, 960, 965, 970) can be made of other rigid plastic or materials and can be made of heavier materials than the plates.

The vibration sensors 950 and 980 can use accelerators, and can have up to 1.5 G of resolution that can enable sufficient resolution for haptic feedback. The vibration sensors 950 and 980 can be connected to the haptic-headphone testing device 810 as described below. The vibration sensors 950 and 980 can be attached to the relatively lightweight headband plate 945 and ear cup plate 985 which, as described above, are connected to the test structure 900 in a way to allow the plates to vibrate and cause the sensors to generate a reading. The measured haptic vibrations of a headphone being tested can be then be used to determine whether the headphone has been assembled correctly or whether it needs calibrating.

In another embodiment microphone sensor 982 can be inserted into the ear cup flange 987 to measure acoustic reproduction of headphone being tested. The microphone sensors can be connected to the haptic-headphone testing device 810 as described below.

Test Structure 910 can be modified to accommodate different headphone configurations. For example, the ear-cup assemblies can be modified to accommodate different headphone types, including on-ear headphones or earbud headphones. Ear cup plate 985 can be countersunk or molded to hold the on-ear headphones or earbud headphones, rather than having flange 987. Microphones can be placed where acoustic energy is intended to be transmitted. As another example, test structure 900 can be modified to account for additional haptic sensors in the headphone being tested. Multiple headband plates can be posited to accommodate additional haptic sensors in the headband. Also, additional vibration sensors can be placed at additional haptic sensation transfer points.

Figure 10A:
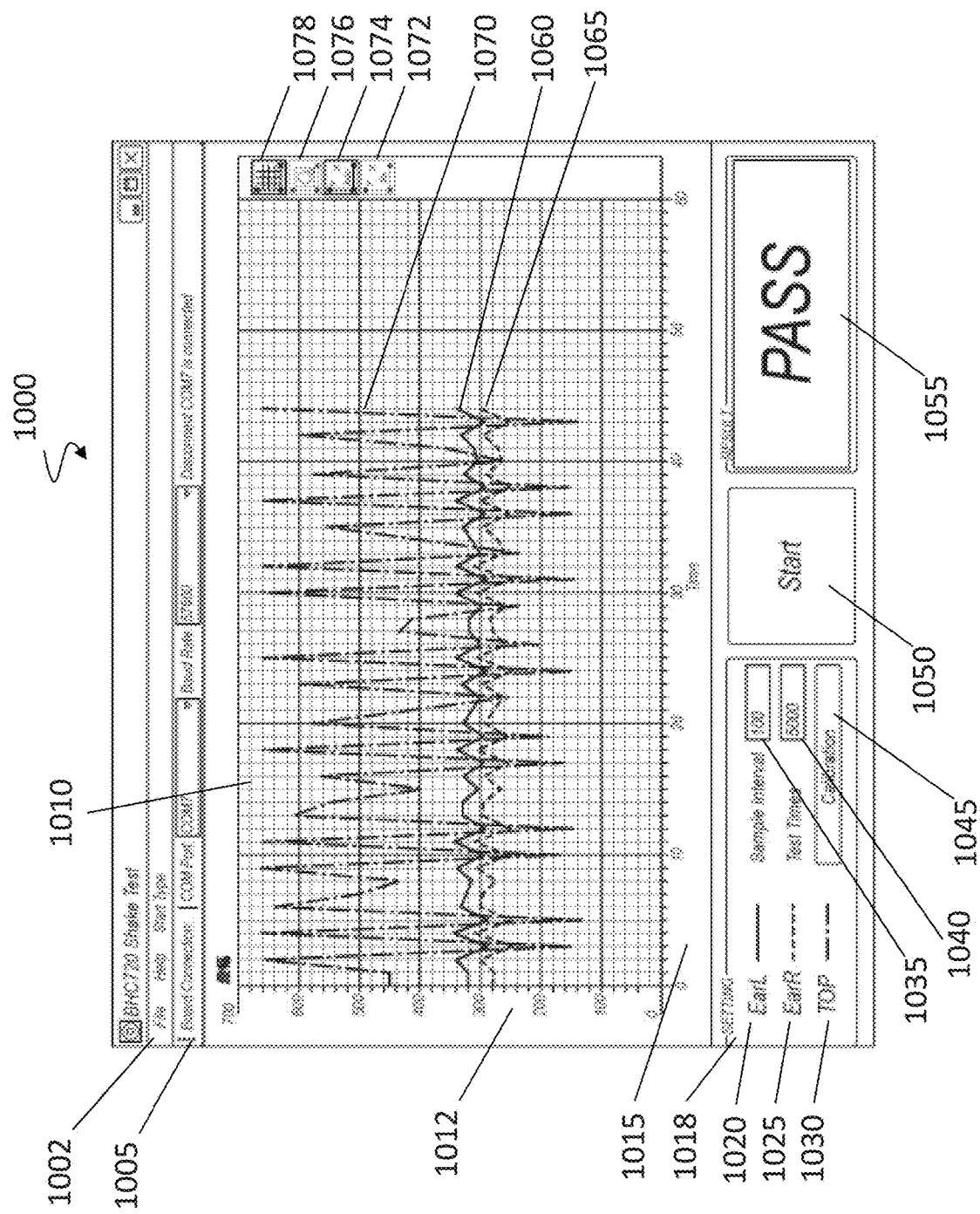
FIGS. 10A-10G show images of a graphical user interfaces for testing haptic headphones.

FIGS. 10A-10G show graphical user interfaces for testing haptic headphones. FIG. 10A shows an enlarged view of the graphical user interface 1000 that can be used to control communications with test structure 900, including sending test signals, receiving sensor signals from the sensors in test structure 900, analyzing the signals, and displaying results. Interface 1000 includes menu bar 1002 that can be used to generally control the application, including selecting a suite of test signals to use, closing interface 1000, saving results, or opening results from a prior test. Interface 1000 includes board connector bar 1005. Board connector bar 1005 can be used to control communication with the sensor boards in test structure 900. Board connector bar 1005 can be used to establish connection with the sensor boards in test structure 9000, select which port to use to communicate with them and the data (i.e., baud) rate. Board connector bar 1005 can be used to control a serial port, USB port, networking connection, or other computer ports for use in interfacing with the sensors of test structure 900.

Interface 1000 includes a graph area 1010. Graph area 1010 can display the status of signals in real time. It can display the audio and/or haptic signals being sent to a headphone being tested or the signals being received from the sensors in test structure 900. Graph area 1010 includes a vertical axis 1012 that displays the magnitude of the signal. Graph area 1010 can dynamically change the scale of the vertical axis 1012 to increase or decrease the size of the signals being displayed. Graph area 1010 can also adapt the units on the vertical axis 1012 to match the type of signal being displayed. A user also can change the vertical axis 1012 by clicking on button 1072. Graph area 1010 includes horizontal axis 1015. Horizontal axis 1015 displays units of time. Graph area 1010 can dynamically change the scale of the horizontal axis 1015 to increase or decrease the size of the signals being displayed. A user also can change the horizontal axis 1015 by clicking on button 1074. Clicking on button 1076 can bring up a zoom tool that allows the user to zoom in on a particular area. Clicking on button 1078 adds or removes the graph lines behind graph area 1010.

Setting interface 1018 can be part of interface 1000. Setting interface 1018 can include a legend that identifies each signal displayed in graph area 1010 by name. For example, a first signal is identified as EarL 1020, which can be understood to be a signal representing the Left Ear. Likewise, EarR 1025 can be understood to be a signal representing the Right Ear and Top 1030 can be understood to be a signal representing the Top of the Head. Setting interface 1018 shows these signals with different dashed formats. Setting interface 1018 can show these signals with different colors as well. Setting interface 1018 an also be used to select which of the signals to display at a given time. Setting interface 1018 can also include sample interval 100 that can control how many samples per second are captured from the sensors in test structure 900. The sampling rate can be set to the maximum sampling rate allowed by the hardware. Setting interface 1018 can include test times 1040 that can be set to control how long a given test is run. Setting interface 1045 can include calibration button 1045, which can be used to measure the baseline response of haptic-headphone testing device 810 when it is empty. Calibration button 1045 can also expose a prompt to allow the user to set the start and stop frequencies for test signals, set the duration of the test, set the amplitude of the test signal, set the minimum or maximum threshold values for haptic or audio feedback. Calibration button 1045 can also expose a prompt that can include values for the haptic frequency response and/or audio frequency response of the entire headphone system. Calibration button 1045 can also be used to send a suite of specific signals to a headphone being tested, measure the signals received from the sensors, and then automatically adjust the reproduction settings of the headphone.

Start/stop button 1050 can be used to initiate a test. Once start button 1050 is pressed, it can display the word "Stop," and if pressed again, stop the test. Result 1055 can display the analyzed results of a given test and inform an operator whether a headphone passed the test. Result 1055 can display whether the whole headphone passed or can display more detailed results pinpointing failure of an explicit part of the headphone (e.g., Left, Right, Top).

Graph area 1010 can display multiple signals simultaneously or select to display one signal at a time. Graph area 1010 can display signal 1070 which represents the signal from a sensor on a headband plate, adjacent to the headband of the headphone being tested, and has a dashed line matching the format of Top 1030. Graph area 1010 can display signals 1060 which represents the signal from a sensor on the left ear cup plate, adjacent to the left ear cup of the headphone being tested, and has a dashed line matching the format of EarL 1020. Graph area 1010 can display signals 1065 which represents the signal from a sensor on the right ear cup plate, adjacent to the right ear cup of the headphone being tested, and has a dashed line matching the format of EarR 1025. Graph area 1010 can also display failing signals such as signals 1080, 1085, and 1090, which showing exemplary failing signals for sensors in the left ear cup plate, right ear cup plate, or headband plate, respectively.

Figure 10D:
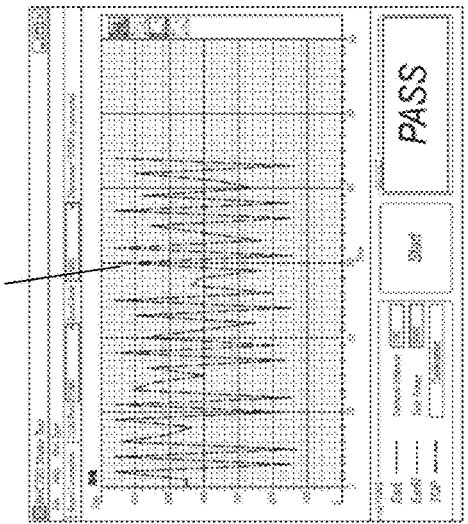
Figure 10G:
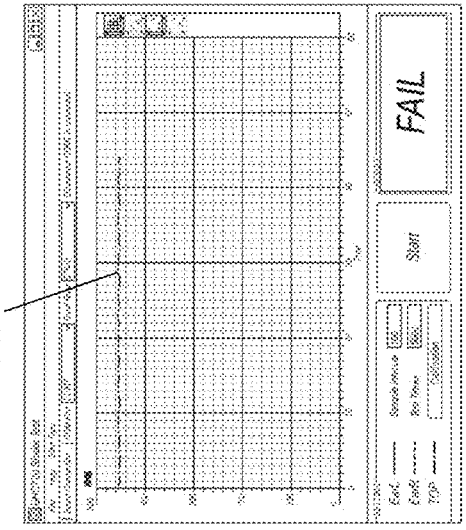
Figure 10C:
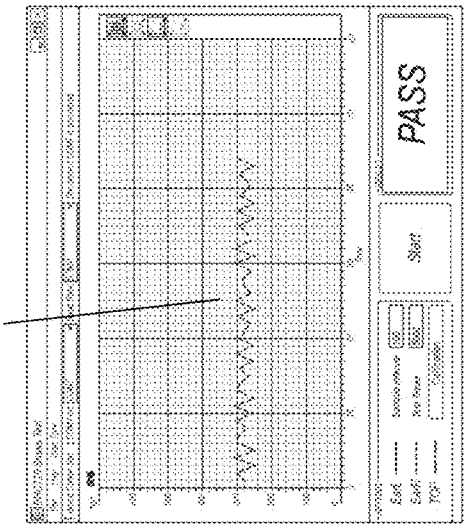
Figure 10F:
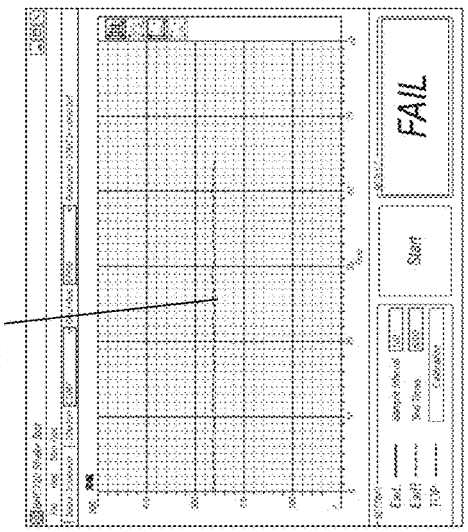
Figure 10B:
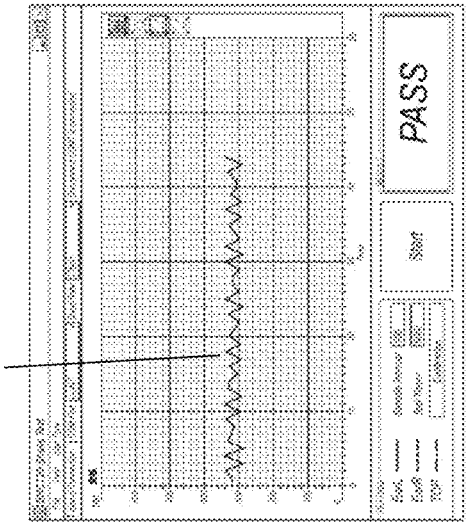
Figure 10E:
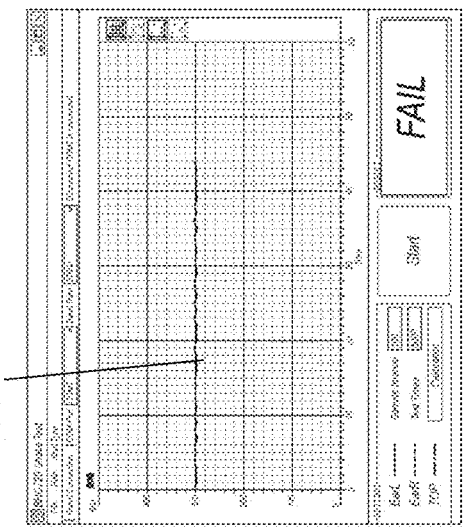

Graph area 1010 can display the 3 points of measurements as depicted in FIG. 10A or show them separately as depicted in FIGS. 10B, 10C, and 10D. FIGS. 10B, 10C, and 10D show specific signals for haptic feedback and what a particular passing signal looks like given a specific input. FIGS. 10E, 10F, and 10G shows specific signals for haptic feedback and what a particular failing signal looks like given a specific input.

Interface 1000 can be used to simultaneously test multiple headphones. Model test signals and sensor response signals for each headphone can be stored. A suite of model test signals for a given headphone can be sent to the headphone and the results compared to the model results. For example, test signals can include sine sweeps, broad spectrum white noise, and short duration impulses and model responses for each of those signals can be stored and compared. Interface 1000 can also be used to receive and show the results of pressure sensors on test structure 900, to ensure the headphones are properly seated and test structure 900 is properly configured. Interface 1000 can also be used to receive and display signals from microphones on test structure 900 to measure the acoustic performance of a headphone and/or the combined acoustic and haptic performance of a headphone.

Interface 1000 can run on haptic-headphone testing device 810, including using haptic-headphone testing device 810's display to display the interface 1000 and using haptic-headphone testing device 810's inputs to interact with and control test structure 900. The testing process is described in more detail below with respect to FIG. 12.

Figure 11:
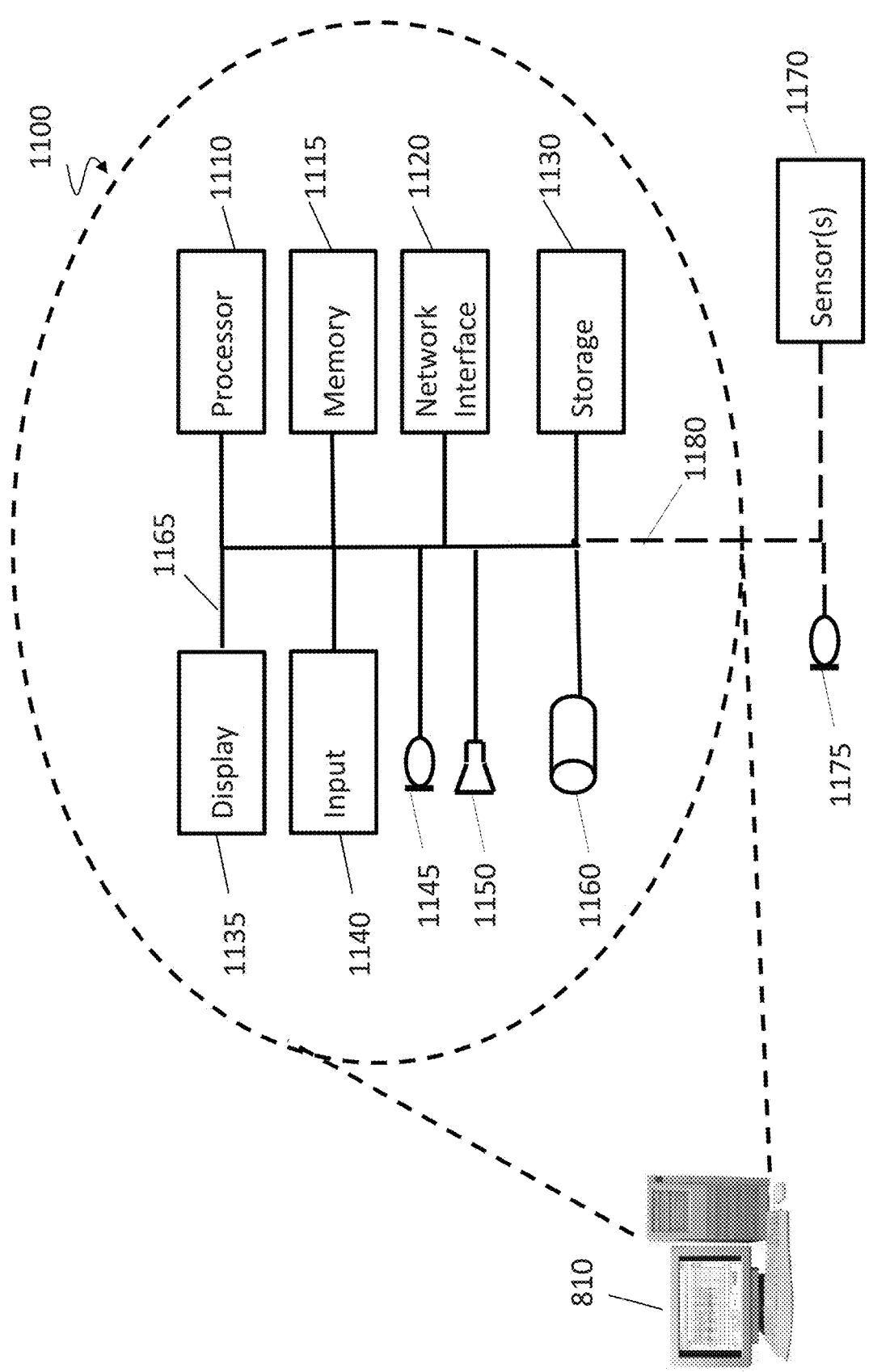
FIG. 11 shows a block diagram of a haptic-headphone testing device.

FIG. 11 shows a block diagram of a haptic-headphone testing device. FIG. 11 presents a computer system 1100 that can be used to implement the techniques described herein for testing haptic headphones, running and displaying interface 1000, and communicating with testing structure 900. Computer system 1100 can be implemented inside of haptic-headphone testing device 810. Bus 1165 can include one or more physical connections and can permit unidirectional or omnidirectional communication between two or more of the components in the computer system 1100. Alternatively, components connected to bus 1165 can be connected to computer system 1100 through wireless technologies such as Bluetooth, Wifi, or cellular technology. The computer system 1100 can include a microphone 1145 for receiving sound and converting it to a digital audio signal. The microphone 1145 can be coupled to bus 1165, which can transfer the audio signal to one or more other components. Computer system 1100 can include a headphone jack 1160 for transmitting audio and data information to headphones and other audio devices.

An input 1140 including one or more input devices also can be configured to receive instructions and information. For example, in some implementations input 1140 can include a number of buttons. In some other implementations input 1140 can include one or more of a mouse, a keyboard, a touch pad, a touch screen, a joystick, a cable interface, and any other such input devices known in the art. Further, audio and image signals also can be received by the computer system 1100 through the input 1140.

Further, computer system 1100 can include network interface 1120. Network interface 1120 can be wired or wireless. A wireless network interface 1120 can include one or more radios for making one or more simultaneous communication connections (e.g., wireless, Bluetooth, low power Bluetooth, cellular systems, PCS systems, or satellite communications). A wired network interface 1120 can be implemented using an Ethernet adapter or other wired infrastructure.

An audio signal, sensor signals, image signal, user input, metadata, other input or any portion or combination thereof, can be processed in the computer system 1100 using the processor 1110. Processor 1110 can be used to perform analysis, processing, editing, playback functions, or to combine various signals, including parsing or analyzing the sensor signals and comparing them to model signals.

For example, processor 1110 can compare the similarities of sensed signals to model signals stored in memory 415 and determine if the signals are similar. As another example, processor 1110 can run interface 1000 as described above or run the testing process as described below for testing haptic headphones. Processor 1110 can generate test signals, such as a test signal at a specific tone or frequency, a signal sweep, or various types of noise. For example, processor 1110 can generate sine sweeps, broad spectrum white noise, and short duration impulses used to test. Processor 1110 can also process sensor signals, analyze the signals, and determine whether a headphone being tested passes the requirements.

Processor 1110 can then use input received from input 1140 to control interface 1000. Processor 1110 can also run applications on computer system 1100 like Alpine's Tune-It mobile application, which can adjust sound profiles. The sound profiles can be used to adjust Alpine's MX algorithm.

Processor 1110 can use memory 1115 to aid in the processing of various signals, e.g., by storing intermediate results. Memory 1115 can be volatile or non-volatile memory. Either or both of original and processed signals can be stored in memory 1115 for processing or stored in storage 430 for persistent storage. Further, storage 1130 can be integrated or removable storage such as Secure Digital, Secure Digital High Capacity, Memory Stick, USB memory, compact flash, xD Picture Card, or a hard drive.

Processor 1110, like processors 350 and 410, can be hardware processors or computer chips. For example, they can be an x86 CPUs, GPUs, or mobile processors such as an ARM or DSP chip.

Image signals accessible in computer system 1100 can be presented on a display device 1135, which can be an LCD display, printer, projector, plasma display, or other display device. Display 1135 also can display one or more user interfaces such as an input interface. The audio signals available in computer system 1100 also can be presented through output 1150. Output device 1150 can be a speaker. Headphone jack 1160 can also be used to communicate digital or analog information, including audio, test signals, and reproduction settings.

Sensors 1170 can be connected to system 1100 through connection 1180. Sensors 1170 can include pressure sensors, including pressure sensors on test structure 900. Sensors 1170 can include vibration sensors, including vibration sensors or other transducers on test structure 900. Sensors 1170 can also connect to system 1100 through network interface 1120, input 1140 or headphone jack 1160. External microphone 1175 can also be connected to system 1100 through connection 1180. External microphone 1175 can also connect to system 1100 through network interface 1120, input 1140 or headphone jack 1160.

Bus 1165, network interface 1120, or headphone jack 1160 can be used to transmit audio and/or data to haptic headphone 830, headphone 120, headphone 200, or headphone 700. The audio and data information sent to a headphone can be used to test the headphones. Bus 1165, network interface 1120, or headphone jack 1160 can also be used to calibrate the headphones. Calibration can include adjusting reproduction parameters for a headphone.

In an alternative embodiment, haptic-headphone testing device 810 can be a mobile device. In an alternative embodiment, computer system 1100 can simultaneously control multiple test structure 900s.

FIG. 12 shows steps for testing haptic headphones. A computer device, such as haptic-headphone testing device 810, can wait for a user to initiate the test (1205) or can initiate the test automatically (1205) once pressure sensors on test rig 900 indicate a headphone are properly seated on test rig 900. Once the test is started, test signals can be obtained (1208) including generating the test signals or retrieving them from memory. The test signals can include separate signals for a headphone's left driver, right driver, and/or haptic device. Once the test signals are obtained, the test signals can be transmitted to the headphone (1210). While the test signals are being transmitted to the headphone (1210), the left ear cup sensors can be captured (1215), the right ear cup sensors can be captured (1220), and the top sensors can be captured (1225). The sensor signals can be displayed while they are being captured. The displaying of the sensors signals can be in real-time. Capturing (1215) can include capturing signals from the vibration sensor and/or the microphone on test structure 900 on an ear cup plate for the left ear cup of the headphone being tested. The capturing (1215) can include recording and/or storing the signals. Capturing (1220) can include capturing signals from the vibration sensors and/or the microphone on test structure 900 on an ear cup plate for the right ear cup of the headphone being tested. The capturing (1220) can include recording and/or storing the signals. Capturing (1225) can include capturing signals from the vibration sensor on test structure 900 on a headband plate for the headband of the headphone being tested. The capturing (1220) can include recording and/or storing the signals. Once one or more of the signals are captured, the captured signals can be aligned (1230). Aligning the captured signals can account for any delay between when the transmitted test signal (1210) is sent, and when the signals received from the sensors are received and captured. Signals need not be aligned to be analyzed.

Once one or more signals can be captured and possibly aligned, the signals can be analyzed (1240). The analysis can be done using a time-comparison function, cross-correlation techniques, stochastic analysis, comparing the frequency spectrum of the two signals, as well as general signal measurements like normalized RMS, coherence, temporal predictability, Gaussian probability density function, or statistical independence. If all signals meet predetermined thresholds of similarity to model signals or predetermined coefficients, the headphones being tested are identified as passing headphones. If the signals do not meet predetermined thresholds of similarity to model signals or predetermined coefficients, the headphones being tested are identified as failing headphones. Once the analysis is complete, the signals and/or the passing or failing result can be displayed (1250). If a headphone is determined to fail, it can be selected for additional testing (1270). If the headphone passed and no additional testing is required (1260), the processor starts over waiting for the test to start (1205).

If additional testing is determined to be required (1260), the headphone can be calibrated (1270). Calibration test signals can be sent to the headphone, the sensors can gauge the headphone's response, and calibration parameters can be sent to the headphone to modify the headphones production parameters (1270). For example, if one driver is more efficient and thus louder than the other driver, the gain for one or both drivers can be adjusted to compensate. As another example, if the haptic feedback is too intense for a given input or too muted, the gain for the haptic feedback can be adjusted. Other reproduction parameters can also be adjusted. The test signals can be changed (1280) to isolate a point of failure or to more deeply examine a headphone. For example, if the headphones failed because of the signal received from sensors adjacent to a left ear phone of the headphones being tested, a suite of signals could be sent to just the left ear phone to determine its specific failure point. As another example, if the haptic sensation is dampened it can suggest a defect in assembly where the transducer is not fully fastened to the headband structure. As another example, if the haptic sensation is dampened or the acoustic transmission is lessened or as a different frequency response, it can suggest the use of non-compliant parts. Modifications to the headphone as a result of testing can include replacing faulty components (e.g. drivers, transducer, headband, connectors), reworking the headphones to tighten fasteners, and re-programming one or more customized tuning parameters or reproduction parameters in the software in the processor for the specific headphone to compensate for hardware variations.

FIG. 11 shows a system capable of performing these steps. The steps described in FIG. 12 need not be performed in the order recited and two or more steps can be performed in parallel or combined. In some implementations, other types of signals can be received and measured.

A number of examples of implementations have been disclosed herein. Other implementations are possible based on what is disclosed and illustrated.

What is claimed is:

1. A headset, comprising:
a headband;
a right ear cup incorporating a first driver therein attached to one end of the headband; wherein the first driver is configured to receive a first channel of an audio signal;
a left ear cup incorporating a second driver therein, attached to the opposite end of the headband and oriented to face back toward the right ear cup; wherein the second driver is configured to receive a second channel of an audio signal;
a haptic device attached to the midpoint of the headband positioned to make contact with the crown of the skull of a user of the headphones;
a low-pass filter, configured to receive the first and second audio channels; and
an amplifier, wherein the input of the amplifier is connected to the output of the low-pass filter,
wherein the amplifier is further configured to amplify the first and second audio channels before they are received by the first and second drivers,
wherein the headset is substantially balanced by placing the low-pass filter and amplifier in one ear cup and batteries to power the low-pass filter and amplifier in the other ear cup.

2. The headset of claim 1, wherein the left ear cup and right ear cup are circumaural.

3. The headset of claim 1, wherein the haptic device is a mono, low-frequency driver, and vibrations from the haptic device are transmitted through the headband, the left ear cup, and the right ear cup.

4. The headset of claim 1, wherein the clamping force applied through the left ear cup and right ear cup is approximately 300 g to 600 g.

5. The headset of claim 1, wherein the haptic device is in a free floating housing which is attached directly to the headband.

6. A headset, comprising:
a rigid headband configured to be placed on the top of a head;
a right ear cup incorporating a first driver therein attached to one end of the rigid headband; wherein the first driver is configured to receive a first channel of an audio signal;
a left ear cup incorporating a second driver therein, attached to the opposite end of the rigid headband and oriented to face back toward the right ear cup; wherein the second driver is configured to receive a second channel of an audio signal;
a haptic device attached to the midpoint of the headband positioned to make contact with a crown of a user's skull, and configured to receive a combination of the first and second audio channels; and
electronics configured to low-pass filter and amplify the combination of the first and second audio channels before they are received by the haptic device, wherein the electronics are further configured to receive a sound profile and modify the first audio channel, the second audio channel, and the combination of the first and second audio channels sent to the haptic device in accordance with the sound profile.

7. The headset of claim 6, wherein the haptic device is aligned perpendicularly to the left and right audio ear cups.

8. The headset of claim 6, wherein the left ear cup and right ear cup are circumaural.

9. The headset of claim 6, wherein the haptic device is a mono, low-frequency driver.

10. The headset of claim 6, wherein the haptic device is configured so vibrations from the haptic device are transmitted to the crown of the user's skull and through the rigid headband, the left ear cup, and the right ear cup to the skull around each user's ears.

11. The headset of claim 6, wherein the rigid headband provides a clamping force of approximately 300 g to 600 g.

12. The headset of claim 6, wherein the rigid headband provides a clamping force sufficient to substantially transmit vibrations down the headband and to the skull around each user's ears.

13. The headset of claim 6, wherein the haptic device is in a free floating housing which is attached directly to the headband and is sized to prohibit a user from compressing the haptic device such that the haptic device is substantially dampened.

\* \* \* \* \*